(12) United States Patent
Schlacks, IV et al.

(10) Patent No.: US 12,140,947 B2
(45) Date of Patent: Nov. 12, 2024

(54) SYSTEM AND METHOD FOR AUTONOMOUS OPERATION OF A MACHINE

(71) Applicant: EQUIPMENTSHARE.COM INC, Columbia, MO (US)

(72) Inventors: William J. Schlacks, IV, Columbia, MO (US); Brian Adams, Columbia, MO (US); James Dianics, Columbia, MO (US); Ian Graves, Columbia, MO (US); Rob Martin, Columbia, MO (US); Scott Pfursich, Columbia, MO (US)

(73) Assignee: EQUIPMENTSHARE.COM INC, Columbia, MO (US)

( * ) Notice: Subject to any disclaimer, the term of this patent is extended or adjusted under 35 U.S.C. 154(b) by 36 days.

(21) Appl. No.: 17/363,116

(22) Filed: Jun. 30, 2021

(65) Prior Publication Data

US 2021/0325872 A1 Oct. 21, 2021

Related U.S. Application Data

(63) Continuation of application No. 16/939,358, filed on Jul. 27, 2020, now Pat. No. 11,079,755, which is a (Continued)

(51) Int. Cl.
*G05D 1/00* (2024.01)
*G05D 1/225* (2024.01)
(Continued)

(52) U.S. Cl.
CPC ......... *G05D 1/0044* (2013.01); *G05D 1/0027* (2013.01); *G05D 1/0055* (2013.01);
(Continued)

(58) Field of Classification Search
CPC .. G05D 1/0044; G05D 1/0027; G05D 1/0055; G05D 1/0238; G05D 1/0255;
(Continued)

(56) References Cited

U.S. PATENT DOCUMENTS 6,434,462 B1 * 8/2002 Bevly .................. G01S 19/14
172/3
9,582,002 B2 2/2017 Cavender-Bares
(Continued)

FOREIGN PATENT DOCUMENTS

WO WO 2018/055921 A1 3/2018

*Primary Examiner* — Jason Holloway
(74) *Attorney, Agent, or Firm* — STINSON LLP

(57) ABSTRACT

A system for autonomous or semi-autonomous operation of a vehicle is disclosed. The system includes a machine automation portal (MAP) application configured to enable a computing device to (a) display a map of a work site and (b) provide a graphical user interface that enables a user to (i) define a boundary of an autonomous operating zone on the map and (ii) define a boundary of one or more exclusion zones. The system also includes a robotics processing unit configured to (a) receive the boundary of the autonomous operating zone and the boundary of each exclusion zone from the computing device, (b) generate a planned command path that the vehicle will travel to perform a task within the autonomous operating zone while avoiding each exclusion zone, and (c) control operation of the vehicle so that the vehicle travels the planned command path to perform the task.

31 Claims, 33 Drawing Sheets

Related U.S. Application Data continuation of application No. PCT/US2020/026877, filed on Apr. 6, 2020.

(60) Provisional application No. 62/987,062, filed on Mar. 9, 2020, provisional application No. 62/829,986, filed on Apr. 5, 2019.

(51) Int. Cl.

| | |
|---|---|
| *G05D 1/247* | (2024.01) |
| *G05D 1/248* | (2024.01) |
| *G05D 1/617* | (2024.01) |
| *G05D 1/622* | (2024.01) |
| *G05D 1/628* | (2024.01) |
| *G05D 1/69* | (2024.01) |
| *G05D 1/692* | (2024.01) |

(52) U.S. Cl.
CPC ......... *G05D 1/0238* (2013.01); *G05D 1/0255* (2013.01); *G05D 1/0278* (2013.01); *G05D 1/225* (2024.01); *G05D 1/247* (2024.01); *G05D 1/248* (2024.01); *G05D 1/617* (2024.01); *G05D 1/622* (2024.01); *G05D 1/628* (2024.01); *G05D 1/69* (2024.01); *G05D 1/692* (2024.01)

(58) Field of Classification Search
CPC .. G05D 1/0278; G05D 1/0219; G05D 1/0295; G05D 2201/0202; E02F 9/0841; E02F 9/205; E02F 9/262
See application file for complete search history.

(56) References Cited

U.S. PATENT DOCUMENTS

| | | | |
|---|---|---|---|
| 10,512,204 B1* | 12/2019 | Gunbatar | ............. A01B 69/004 |
| 10,990,245 B2* | 4/2021 | Marsolek | ............... G07C 5/008 |
| 11,180,189 B2 | 11/2021 | Medagoda et al. | |
| 2007/0061053 A1 | 3/2007 | Zeitzew | |
| 2010/0094481 A1 | 4/2010 | Anderson | |
| 2011/0295423 A1 | 12/2011 | Anderson | |
| 2014/0324291 A1* | 10/2014 | Jones | ................... G05D 1/0278 |
| | | | 701/41 |
| 2014/0336818 A1 | 11/2014 | Posselius et al. | |
| 2016/0334804 A1 | 11/2016 | Webber et al. | |
| 2017/0228108 A1 | 8/2017 | Marsolek | |
| 2017/0339820 A1 | 11/2017 | Foster et al. | |
| 2018/0255704 A1 | 9/2018 | Kamfors et al. | |
| 2019/0011912 A1* | 1/2019 | Lockwood | ........... G05D 1/0027 |
| 2019/0090472 A1 | 3/2019 | Crinklaw et al. | |
| 2019/0171212 A1 | 6/2019 | Wang et al. | |
| 2019/0179332 A1 | 6/2019 | Cheng et al. | |
| 2019/0375450 A1 | 12/2019 | Madagoda et al. | |
| 2020/0050208 A1 | 2/2020 | Frick et al. | |
| 2021/0095978 A1 | 4/2021 | Letwin et al. | |
| 2021/0124348 A1 | 4/2021 | Hyde et al. | |

\* cited by examiner

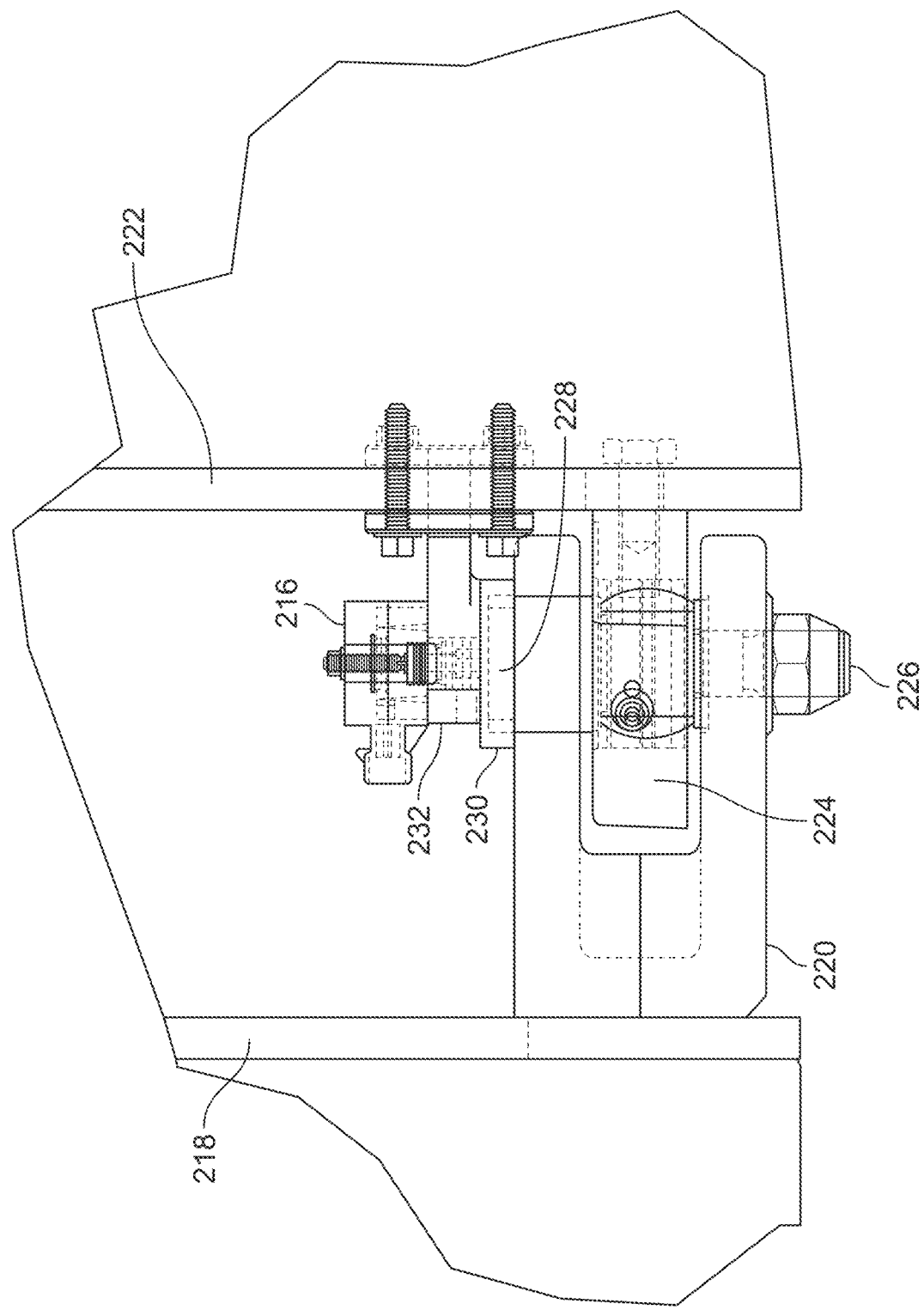

|   | 1 | 2 | 3 | 4 | 5 |
|---|---|---|---|---|---|
| 1 | ( Boundary = true, Keepout = false, Elevation = 560.34' Compaction = Low ) | ( Boundary = true, Keepout = false, Elevation = 560.34' Compaction = Low ) | ( Boundary = true, Keepout = false, Elevation = 560.34" Compaction = Low ) | ( Boundary = true, Keepout = false, Elevation = 560.34' Compaction = Low ) | ( Boundary = true, Keepout = false, Elevation = 560.34' Compaction = Low ) |
| 2 | ( Boundary = true, Keepout = false, Elevation = 560.34' Compaction = Low ) | ( Boundary = false, Keepout = false, Elevation = 565.34' Compaction = Low ) | ( Boundary = false, Keepout = false, Elevation = 565.34" Compaction = Low ) | ( Boundary = false, Keepout = false, Elevation = 565.34' Compaction = Low ) | ( Boundary = true, Keepout = false, Elevation = 560.34' Compaction = Low ) |
| 3 | ( Boundary = true, Keepout = false, Elevation = 560.34' Compaction = Low ) | ( Boundary = false, Keepout = false, Elevation = 565.34' Compaction = Low ) | ( Boundary = false, Keepout = false, Elevation = 565.34" Compaction = Low ) | ( Boundary = false, Keepout = false, Elevation = 565.34' Compaction = Low ) | ( Boundary = true, Keepout = false, Elevation = 560.34' Compaction = Low ) |
| 4 | ( Boundary = true, Keepout = false, Elevation = 560.34' Compaction = Low ) | ( Boundary = false, Keepout = false, Elevation = 565.34' Compaction = Low ) | ( Boundary = false, Keepout = false, Elevation = 565.34" Compaction = Low ) | ( Boundary = false, Keepout = false, Elevation = 565.34' Compaction = Low ) | ( Boundary = true, Keepout = false, Elevation = 560.34' Compaction = Low ) |
| 5 | ( Boundary = true, Keepout = false, Elevation = 560.34' Compaction = Low ) | ( Boundary = true, Keepout = false, Elevation = 560.34' Compaction = Low ) | ( Boundary = true, Keepout = false, Elevation = 560.34" Compaction = Low ) | ( Boundary = true, Keepout = false, Elevation = 560.34' Compaction = Low ) | ( Boundary = true, Keepout = false, Elevation = 560.34' Compaction = Low ) |

FIG. 14

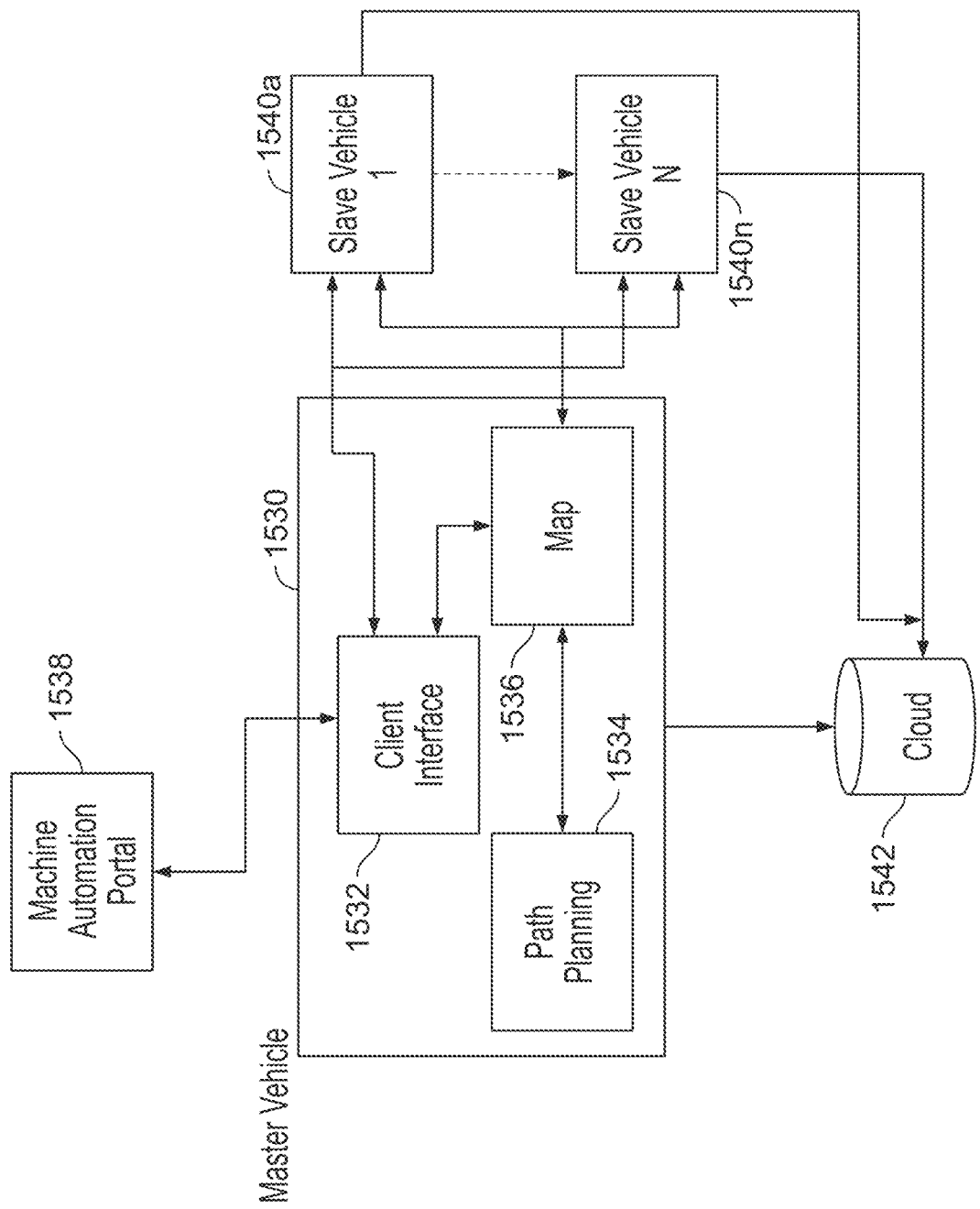

SYSTEM AND METHOD FOR AUTONOMOUS OPERATION OF A MACHINE

CROSS-REFERENCE TO RELATED APPLICATIONS

This application is a continuation of and claims priority to U.S. patent application Ser. No. 16/939,358 filed on Jul. 27, 2020, which is a continuation of and claims priority to PCT Patent Application Serial No. PCT/US2020/026877 filed on Apr. 6, 2020, which is based on and claims priority to U.S. Provisional Application Ser. No. 62/987,062 filed on Mar. 9, 2020, and U.S. Provisional Application Ser. No. 62/829,986 filed on Apr. 5, 2019, each of which is incorporated herein by reference in its entirety.

STATEMENT REGARDING FEDERALLY SPONSORED RESEARCH OR DEVELOPMENT

Not applicable.

STATEMENT REGARDING JOINT RESEARCH AGREEMENT

Not applicable.

FIELD OF THE INVENTION

The present disclosure is generally related to the operation of machines such as construction vehicles and, in particular, to a system and method for enabling autonomous or semi-autonomous operation of such vehicles.

BACKGROUND OF THE INVENTION

Construction and related fields of work may involve a wide variety of tasks, each of which may require different types of vehicles and other equipment. Typical construction vehicles include trench roller compactors, skid steers/skid loaders, excavators, and dump trucks/haulers, any combination of which may be used at a job site. Some types of construction vehicles may be remotely operated in order to improve workplace safety at hazardous work sites. For example, a trench roller compactor may be steered using a remote control system that uses an infrared signal to provide line-of-sight control with the compactor. Other types of construction vehicles may autonomously perform certain repetitive processes, but typically require customized hardware to provide those capabilities. Thus, there is a need for an improved system that enables autonomous or semi-autonomous operation of construction vehicles and other machines that provides features that are not available in conventional systems.

BRIEF SUMMARY OF THE INVENTION

The present invention is directed to a system and method for autonomous or semi-autonomous operation of a vehicle. The system includes a robotics processing unit that may be located on the vehicle, located on a central work site control system that controls a plurality of vehicles, or located on a master vehicle that controls a plurality of slave vehicles. The system also includes a machine automation portal (MAP) application configured to be executed on a computing device, such as a personal computing tablet, a smartphone, a smart watch or other wearable device, a personal computer, a laptop computer, a personal digital assistant, smart glasses, a virtual reality (VR) head set, or any other electronic computing device that is capable of wireless communication with the robotics processing unit.

A system for autonomous or semi-autonomous operation of a vehicle in accordance with one exemplary embodiment of the invention described herein comprises: a MAP application configured to be executed on a computing device, wherein the MAP application is configured to enable the computing device to (a) display a map of a work site and (b) provide a graphical user interface that enables a user to define a boundary of an autonomous operating zone on the map; and a robotics processing unit configured to receive the boundary of the autonomous operating zone from the computing device, wherein the robotics processing unit is further configured to control operation of the vehicle so that the vehicle performs a task within the autonomous operating zone.

A system for autonomous or semi-autonomous operation of a vehicle in accordance with one exemplary embodiment of the invention described herein comprises: a MAP application configured to be executed on a computing device, wherein the MAP application is configured to enable the computing device to (a) display a map of a work site and (b) provide a graphical user interface that enables a user to (i) define a boundary of an autonomous operating zone on the map and (ii) define a boundary of one or more exclusion zones; a robotics processing unit configured to (a) receive the boundary of the autonomous operating zone and the boundary of each exclusion zone from the computing device, (b) generate a planned command path that the vehicle will travel to perform a task within the autonomous operating zone while avoiding each exclusion zone, and (c) control operation of the vehicle so that the vehicle travels the planned command path to perform the task; and wherein the graphical user interface of the MAP application enables the user to transmit an emergency stop command to an emergency stop system to thereby stop operation of the vehicle.

Various other embodiments and features of the present invention are described in detail below, or will be apparent to those skilled in the art based on the disclosure provided herein, or may be learned from the practice of the invention.

BRIEF DESCRIPTION OF THE DRAWINGS

Various exemplary embodiments of the invention are described below with reference to the attached drawing figures, wherein:

FIG. 5 is a side elevational view of a rotary potentiometer that functions as the steering angle sensor of the compactor shown in FIGS. 2A and 2B;

FIG. 14 is a diagram showing examples of information stored for each map grid point using the system of FIG. 1;

FIG. 15B is a block diagram of a system for enabling autonomous or semi-autonomous operation of multiple vehicles or other machines using a master vehicle and multiple slave vehicles;

FIGS. 17-22 are screen shots of the machine automation portal (MAP) application executed on the computing device of FIG. 1 during the setting of a boundary and the performance of a compaction task, wherein FIG. 17 shows an initial boundary for an autonomous operating zone, FIG. 18 shows an augmented reality (AR) view while setting the boundary, FIG. 19 shows a final boundary for the autonomous operating zone, FIG. 20 shows the autonomous operating zone with a command path for a compactor during performance of the task, FIG. 21 shows the autonomous operating zone and autonomous path taken by the compactor during performance of the task, and FIG. 22 shows the autonomous operating zone, command path, and autonomous path taken by the compactor during performance of the task;

FIGS. 23-26 are screen shots of the machine automation portal (MAP) application executed on the computing device of FIG. 1 during the performance of a compaction task, wherein FIG. 23 shows an autonomous operating zone and autonomous path for a compactor during performance of the task; FIG. 24 shows a three-dimensional view of the compactor and surrounding terrain when the compactor is paused, FIG. 25 shows the settings menu for the screen shot shown in FIG. 23, and FIG. 26 shows an elevation heatmap for the autonomous operating zone during performance of the task; and FIGS. 27-28 are screen shots of the MAP application executed on the computing device of FIG. 1 during the performance of a point-to-point travel task, wherein FIG. 17 shows a command path for the compactor during performance of the task, and FIG. 18 shows a command path for the compactor while avoiding an exclusion zone during performance of the task.

DETAILED DESCRIPTION OF PREFERRED EMBODIMENT

The present invention is directed to a system and method that enables autonomous or semi-autonomous operation of one or more construction vehicles or other machines. While the invention will be described in detail below with reference to various exemplary embodiments, it should be understood that the invention is not limited to the specific configuration or methodologies of any of these embodiments. In addition, although the exemplary embodiments are described as embodying several different inventive features, those skilled in the art will appreciate that any one of these features could be implemented without the others in accordance with the invention.

In this disclosure, references to "one embodiment," "an embodiment," "an exemplary embodiment," or "embodiments" mean that the feature or features being described are included in at least one embodiment of the invention. Separate references to "one embodiment," "an embodiment," "an exemplary embodiment," or "embodiments" in this disclosure do not necessarily refer to the same embodiment and are also not mutually exclusive unless so stated and/or except as will be readily apparent to those skilled in the art from the description. For example, a feature, structure, function, etc. described in one embodiment may also be included in other embodiments, but is not necessarily included. Thus, the present invention can include a variety of combinations and/or integrations of the embodiments described herein.

Figure 1:
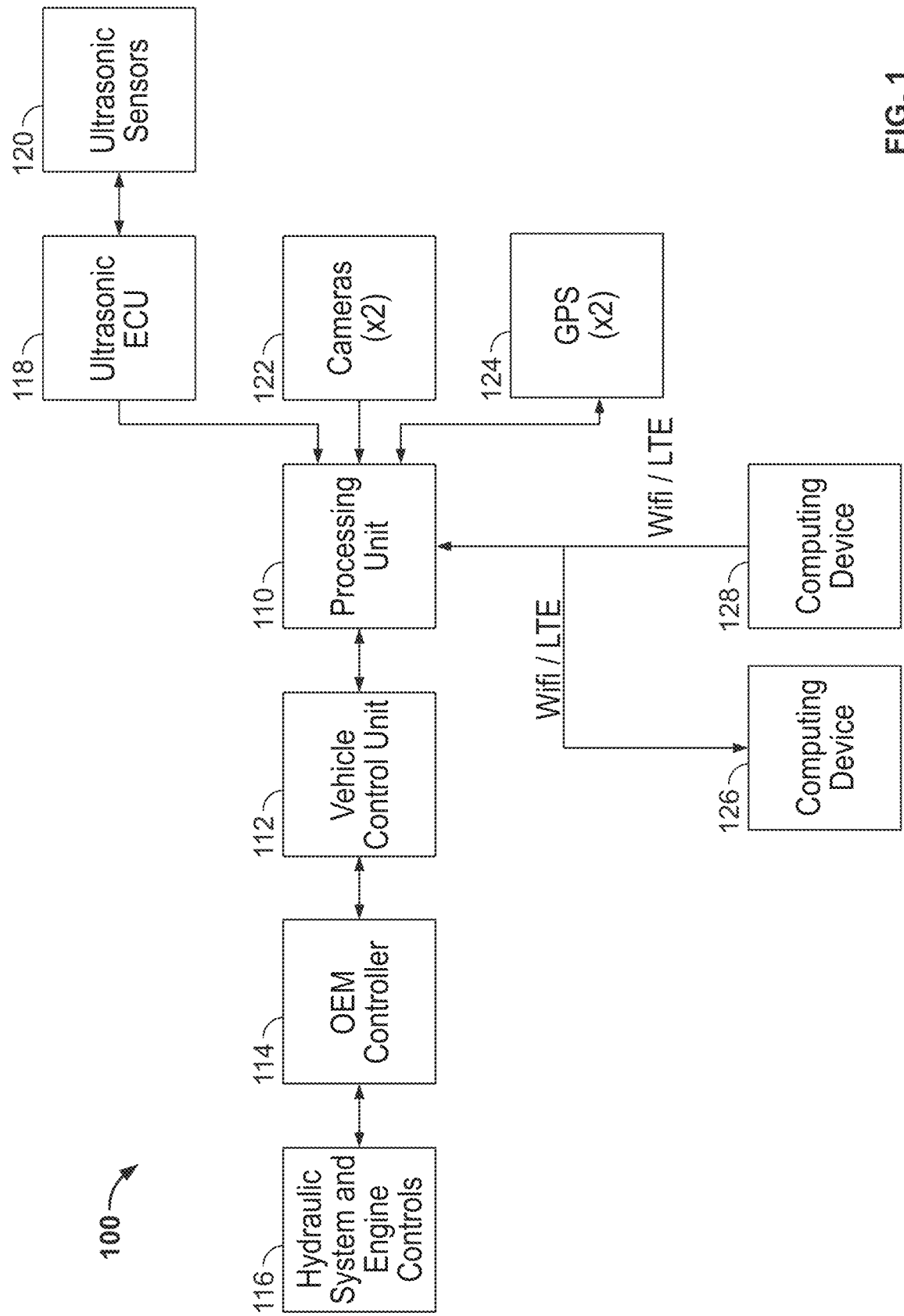
FIG. 1 is block diagram of a system for enabling autonomous or semi-autonomous operation of a vehicle or other machine.

Referring to FIG. 1, a system for enabling autonomous or semi-autonomous operation of a construction vehicle or other machine is shown generally as reference numeral 100. In an exemplary embodiment, the machine comprises a conventional construction vehicle that has been modified (i.e., retrofitted) with components to enable autonomous or semi-autonomous operation of the vehicle. In other embodiments, the machine comprises a construction vehicle that is originally designed with components to enable autonomous or semi-autonomous operation of the vehicle. A variety of different types of machines may be operated using the system of FIG. 1, such as trench roller compactors (an example of which is described below in connection with FIGS. 2-6), skid steers/skid loaders, excavators, dump trucks/haulers, mowers, street sweepers, snow blowers and plows, scrapers, and pavers. Of course, other types of machines that may be operated in accordance with the invention will be apparent to those skilled in the art.

System 100 includes a variety of different components, including a robotics processing unit 110, a vehicle control unit 112, a controller 114, a hydraulic system and engine controls 116, an ultrasonic electronics control unit (ECU)

118 connected to one or more ultrasonic sensors 120, three-dimensional (3D) depth cameras 122, global positioning system (GPS) receivers 124, and one or more computing devices 126 and 128. In the exemplary embodiment, the construction vehicle comprises a conventional trench roller compactor that includes controller 114 and hydraulic system and engine controls 116, and the remaining components shown in FIG. 1 are provided to enable autonomous or semi-autonomous operation of the vehicle in accordance with the present invention, as described below. Of course, for embodiments in which the machine comprises a construction vehicle that is originally designed with components to enable autonomous or semi-autonomous operation of the vehicle, some of the components shown in FIG. 1 may not be required—e.g., processing unit 110 may be coupled directly to controller 114 without the use of vehicle control unit 112 (which largely functions as a digital-to-analog converter in the system of FIG. 1).

Robotics processing unit 110 is configured to communicate with one or more computing devices (such as computing devices 126 and 128) via a wireless communications link. As described below, each computing device is configured to execute a machine automation portal (MAP) application that enables the user to define a boundary for one or more operational areas (e.g., an outer-geo-fence and/or autonomous operating zone) and exclusion zones for a vehicle, configure a task for the vehicle, control operation of the vehicle (e.g., start, pause, and re-start the vehicle), trigger an emergency stop of the vehicle, view other on-site vehicles and assets, view data transmitted by the vehicle (e.g., live sensor data and vehicle diagnostics), view notifications relating to operation of the vehicle (e.g., time remaining for the task, vehicle blocked, etc.), as well as other functions described herein.

Each computing device may comprise a personal computing tablet, a smartphone, a smart watch or other wearable device, a personal computer, a laptop computer, a personal digital assistant, smart glasses, a virtual reality (VR) head set, or any other electronic computing device that is capable of wireless communication with robotics processing unit 110. Preferably, the computing device includes a WiFi transceiver that enables communication with robotics processing unit 110 over a Wi-Fi network (i.e., a wireless network that operates in accordance with the Wi-Fi IEEE 802 communications protocol) and/or a cellular transceiver that enables communication with robotics processing unit 110 over a cellular network (i.e., a network that operates in accordance with the long term evolution (LTE) communications standard or other cellular standards). Of course, other types of wireless networks and communication protocols may also be used in accordance with the invention, such as Bluetooth® and other near-field communication (NFC) communication protocols. In this embodiment, computing device 126 comprises an Apple® iPad Pro and computing device 128 comprises an Apple® Watch, each of which is capable of communicating with robotics process node 110 over either a WiFi network or an LTE network. Of course, any number of computing devices may be used in accordance with the invention.

Robotics processing unit 110 is also configured to fuse sensor data received from a variety of different vehicle-mounted sensors, such as GPS receivers, 3D depth cameras, ultrasonic sensors, and other types of sensors known to those skilled in the art.

In this embodiment, the sensors include GPS receivers 124 that are configured to determine the position and orientation of the vehicle (e.g., by implementing real-time kinetic (RTK) positioning). Each GPS receiver may comprise, for example, the Duro® ruggedized GNSS receiver available from Swift Navigation, Inc. of San Francisco, California.

The sensors also include environmental sensors that are used to detect obstacles in the path of the vehicle. The environmental sensors comprise one or more ultrasonic sensors 120 (e.g., the front, side and rear ultrasonic sensors illustrated in FIG. 2A, described below) that are connected to an ultrasonic ECU 118 that aggregates the sensor data. The ultrasonic ECU and sensors may comprise, for example, the Off-Highway TD F037S07211 ultrasonic sensor system available from Robert Bosch LLC (Bosch Mobility Solutions USA) of Farmington Hills, Michigan. The environmental sensors also comprise 3D depth cameras 122 (e.g., the front and rear depth cameras illustrated in FIG. 2A, described below). Each 3D depth camera may comprise, for example, the CamBoard pico flex 3D camera development kit (which is based on time-of-flight (ToF) technology) available from PMD Technologies AG of Siegen, Germany.

Further, it should be noted that robotics processing unit 110, vehicle control unit 112, and GPS receivers 124 have inertial measurement units (IMUs) that are used for location, orientation, tilt detection and alerting, and compaction sensing.

Of course, it should be understood that the present invention is not limited to the specific types of sensors described above in connection with system 100 of FIG. 1, and that other types of sensors may also be used within the scope of the invention. For example, the vehicle may include LiDAR-based safety sensors for triggering an emergency stop when an imminent collision is detected. Another example of a safety sensor is a natural gas detector that is configured to trigger an emergency stop when unsafe levels of natural gas are detected (indicating a potential leak). In addition, the mapping and path execution functions may be enhanced, in some embodiments, by sensor suites external to the vehicle, such as a drone-mounted camera or the like that provides the system with image data and/or depth data representing the autonomous operating zone.

Robotics processing unit 110 is further configured to interface with vehicle control unit 112, which in turn interfaces with the vehicle's original controller 114 and hydraulic system and engine controls 116. As described in greater detail below, robotics processing unit 110 utilizes the information received from the computing devices and the various sensors to provide control data to vehicle control unit 112 and thereby autonomously or semi-autonomously operate the vehicle. In some implementations, the vehicle operates wholly autonomously. In other implementations, the vehicle operates under the control of the user under some conditions (e.g., when the user initiates an emergency stop of the vehicle) and operates autonomously under other conditions.

Figure 2A:
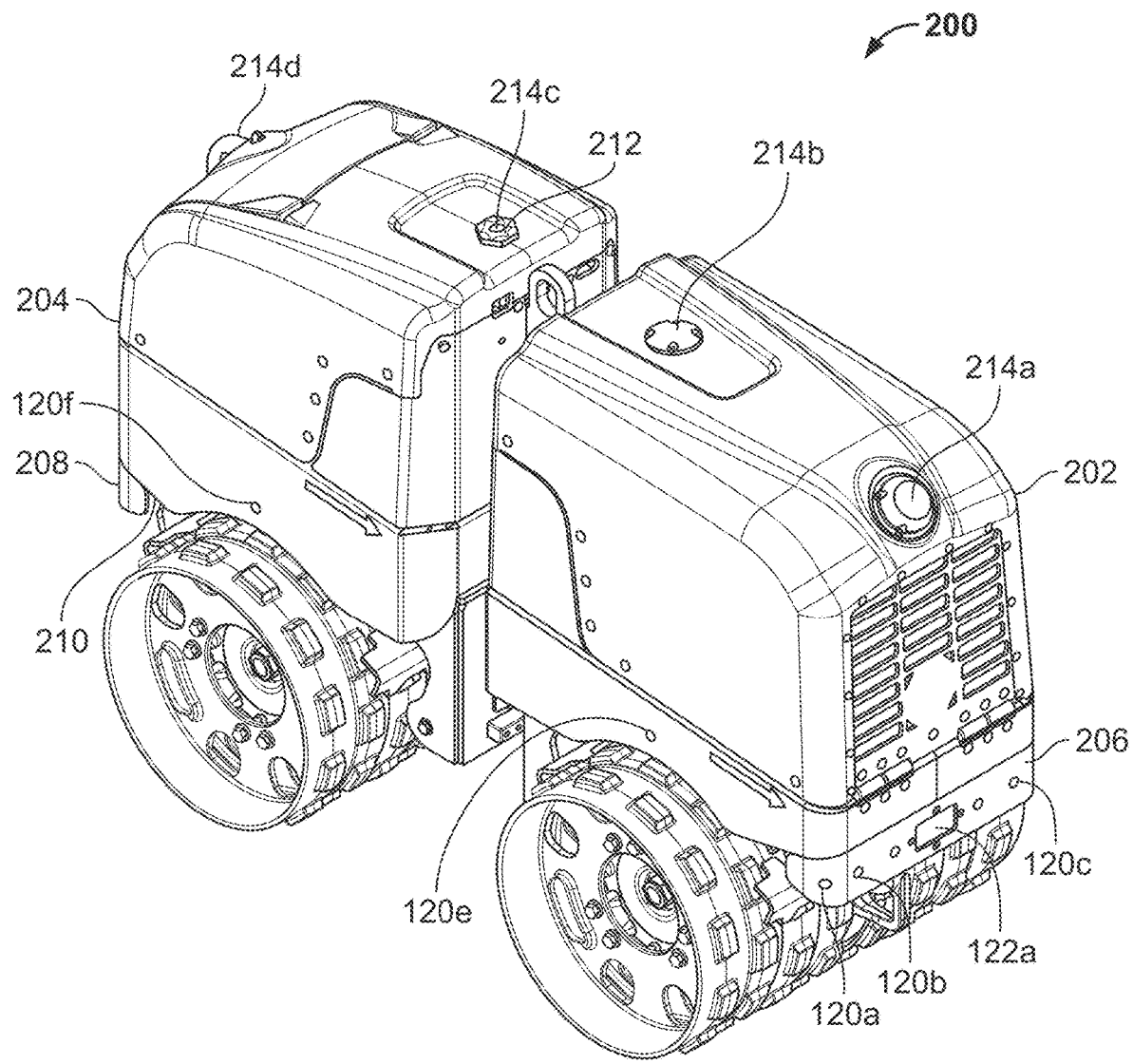
FIG. 2A is a perspective view of a trench roller compactor that may be operated using the system of FIG. 1.

Referring to FIG. 2A, an example of a trench roller compactor that may be operated autonomously or semi-autonomously using system 100 is shown generally as reference numeral 200. Compactor 200 comprises a conventional construction vehicle (in this case, an RTSC3 trench roller compactor available from Wacker Neuson Corporation of Menomonee Falls, Wisconsin) that includes a front compartment 202 connected via an articulating center joint to a rear compartment 204. GPS receivers (not shown) are located underneath the front and rear hoods of front compartment 202 and rear compartment 404, respectively. It should be understood that these GPS receivers correspond to GPS receivers 124 shown in FIG. 1.

Figure 3A:
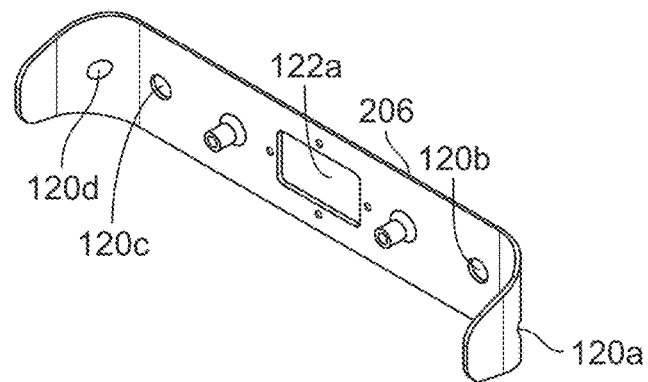
FIG. 3A is a rear perspective view of an exemplary bumper that may be used on the compactor shown in FIGS. 2A and 2B.
Figure 3B:
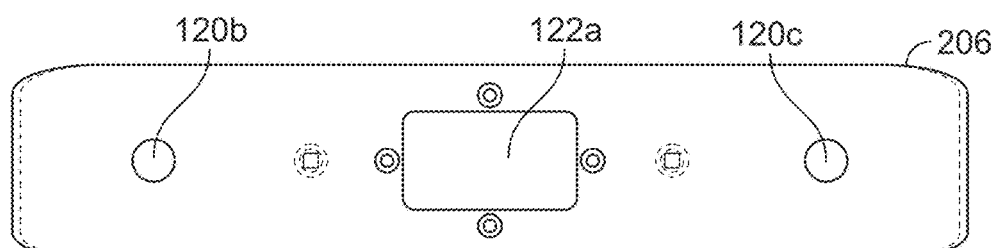
FIG. 3B is a front elevational view of the bumper shown in FIG. 3A.
Figure 3C:
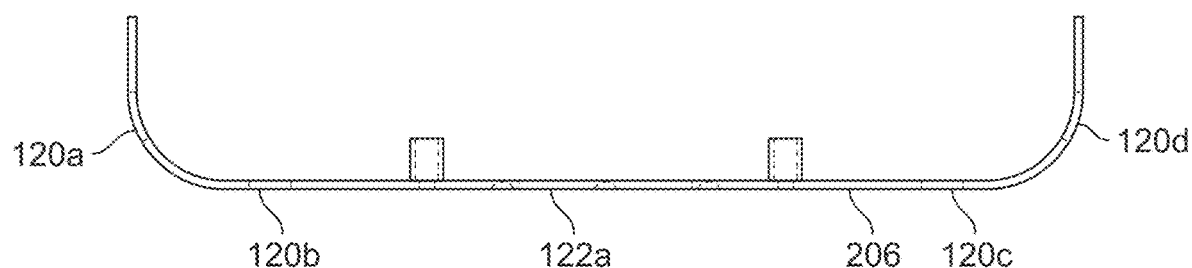
FIG. 3C is a top plan view of the bumper shown in FIGS. 3A and 3B.
Figure 4B:
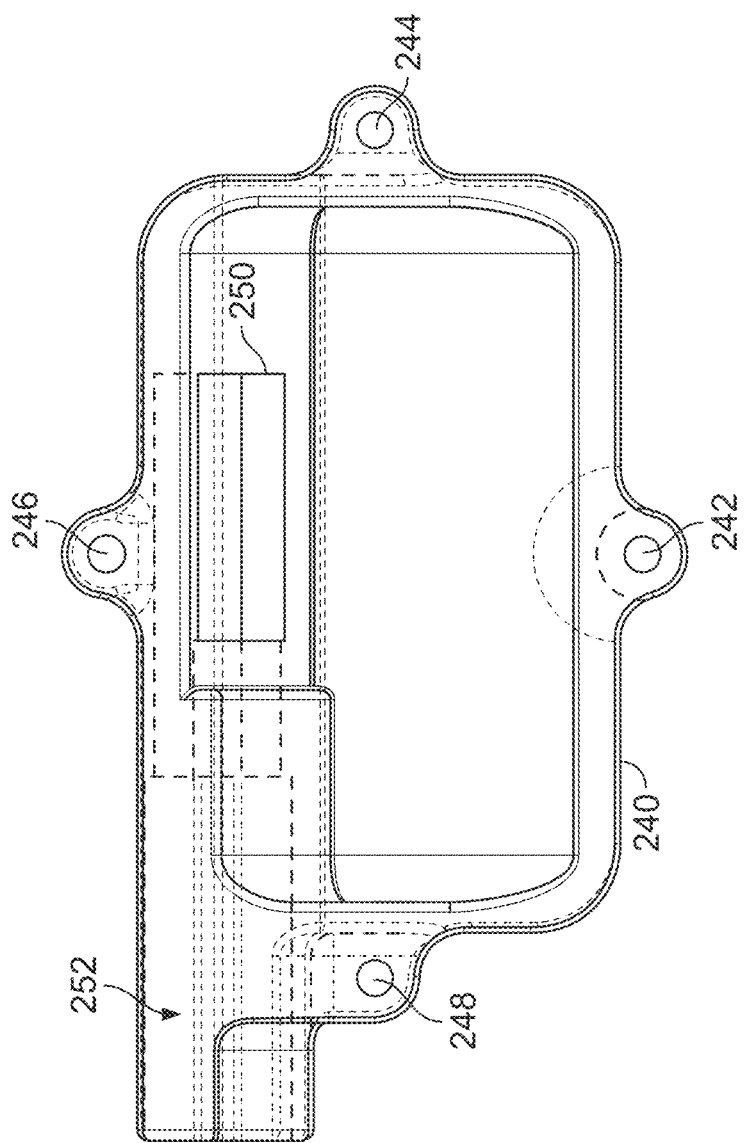
FIG. 4B is a front elevational view of the camera enclosure shown in FIG. 4A.
Figure 4A:
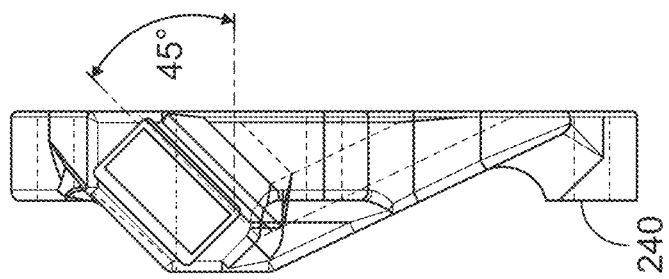
FIG. 4A is a side elevational view of an exemplary camera enclosure that may be mounted within the central opening of the bumper shown in FIGS. 3A-3C.

Front compartment 202 has been modified to include an integrated front bumper 206 that mounts a 3D depth camera and four ultrasonic sensors. As best shown in FIGS. 3A-3C, front bumper 206 includes a generally rectangular-shaped central opening 122a that is sized to receive a camera enclosure for the 3D depth camera, as well as four smaller openings 120a, 120b, 120c and 120d each of which is sized to receive an ultrasonic sensor. FIGS. 4A and 4B illustrate an exemplary camera enclosure 240 that may be mounted in central opening 122a of bumper 206 via mounting holes 242, 244, 246 and 248. Camera enclosure 240 is configured so that the camera is positioned at an angle of forty-five degrees with respect to the horizontal plane, as shown in FIG. 4A. Of course, other camera angles may be used for different types of cameras and/or different implementations in accordance with the invention. The camera may be connected to robotics processing unit 110 (see FIG. 1) via a USB cable that extends through a USB cable chamber 252.

Referring back to FIG. 2A, rear compartment 204 has been modified to include an integrated rear bumper 208 that mounts a 3D depth camera and four ultrasonic sensors (not shown). It should be understood that the configuration of rear bumper 208 is similar to that of front bumper 206. An ultrasonic sensor is also mounted on each side of front compartment 202 and each side of rear compartment 204, wherein two of the four openings for these ultrasonic sensors are shown as reference numbers 120e and 120f in FIG. 2A.

It should be understood that the two 3D depth cameras and the twelve ultrasonic sensors described in connection with FIG. 2A correspond to 3D depth cameras 122 and ultrasonic sensors 120, respectively, shown in FIG. 1.

Figure 2B:
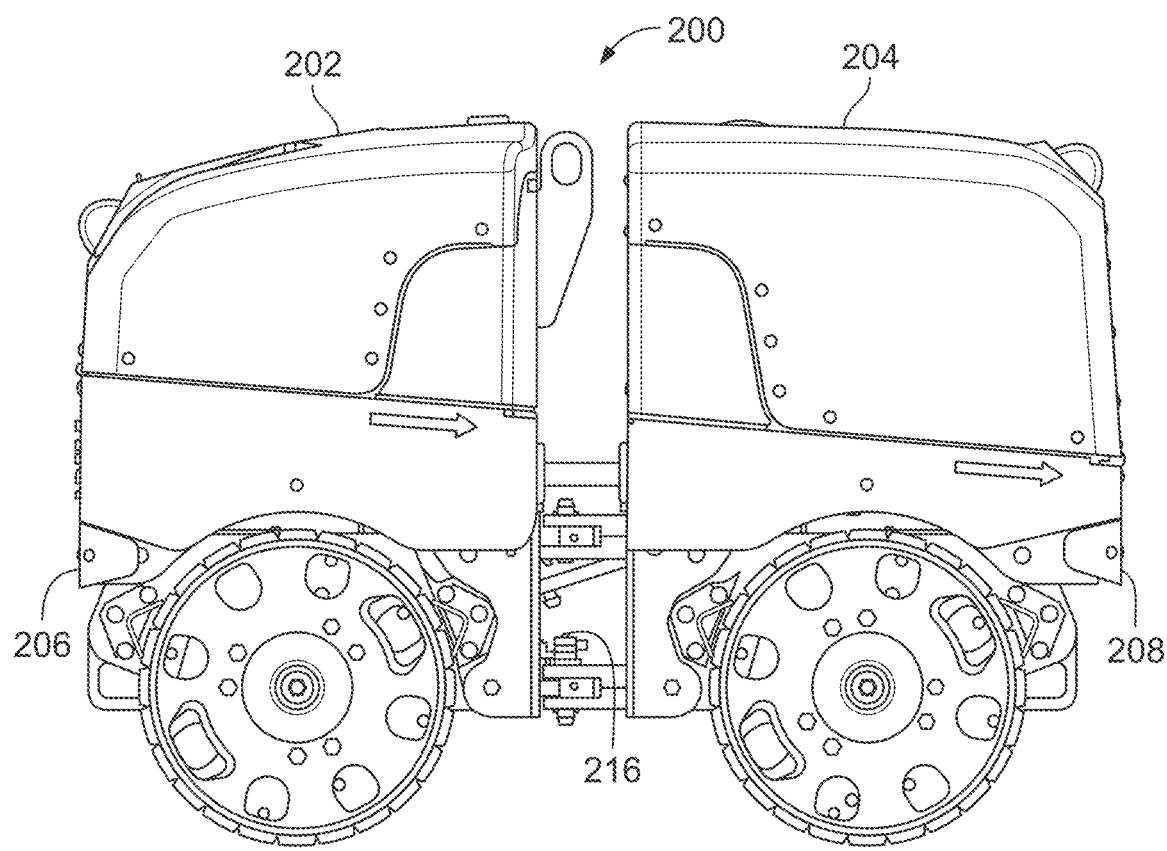
FIG. 2B is a side elevational view of the compactor shown in FIG. 2A, showing the position of a steering angle sensor.
Figure 2C:
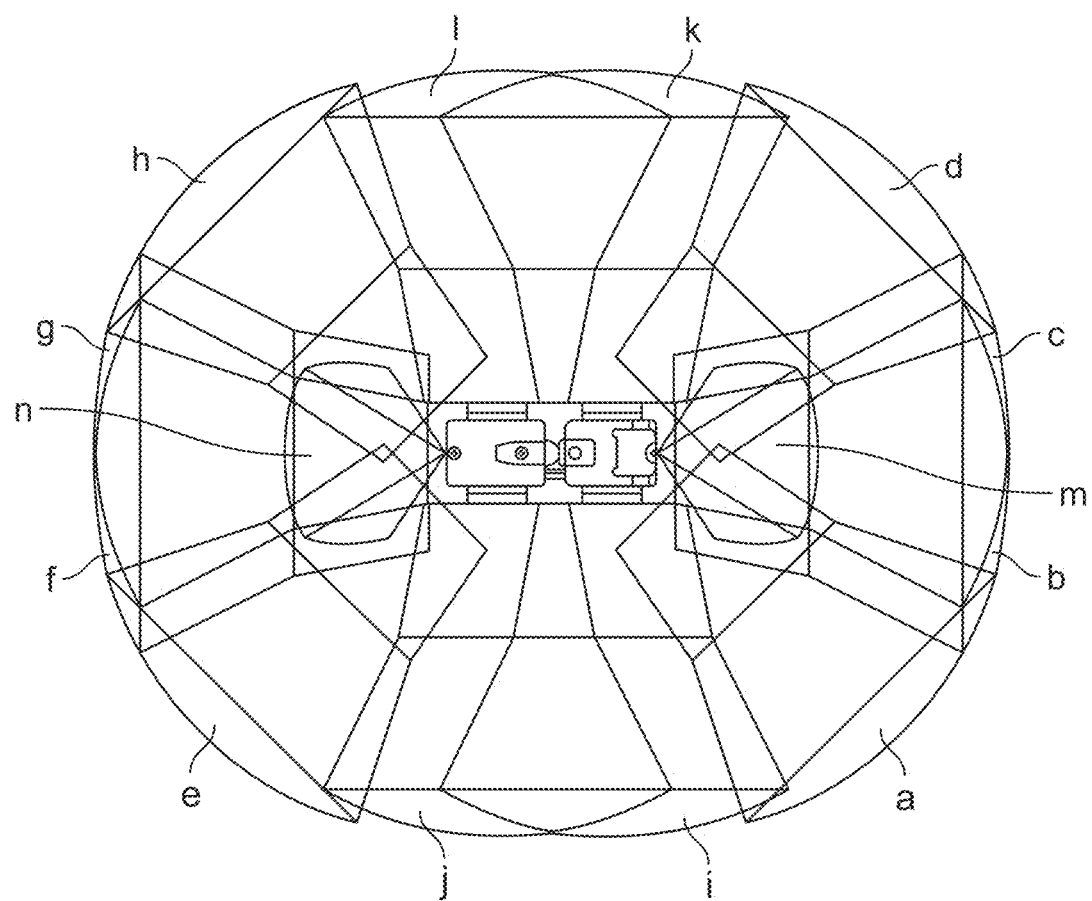
FIG. 2C is a diagram showing the field of view of the camera and ultrasonic sensors used on the compactor shown in FIGS. 2A and 2B.

FIG. 2C illustrates the generally cone-shaped fields of view for the two 3D depth cameras and twelve ultrasonic sensors described in connection with FIG. 2A. Specifically, the fields of view designated a, b, c and d correspond to the four ultrasonic sensors mounted on front bumper 206, the fields of view designated e, f, g and h correspond to the four ultrasonic sensors mounted on rear bumper 208, the fields of view designated i, j, k and l correspond to the four ultrasonic sensors mounted on the sides of front compartment 202 and rear compartment 204, and fields of view m and n correspond to the 3D depth cameras mounted on front bumper 206 and rear bumper 208, respectively. It can be seen that this sensor arrangement provides a 360 degree field of view around compactor 200. Of course, the invention is not limited to any specific types of sensors and/or any particular number of sensors, and other arrangements may be used for different implementations within the scope of the invention.

Referring back to FIG. 2A, front compartment 202 includes two infrared sensors 214a and 214b and rear compartment 204 include one infrared sensor 214c, as shown, which enable receipt of control signals to drive the vehicle from a remote control device. The infrared sensors are connected to vehicle control unit 112, which watches for an infrared signal from the remote control device and immediately relays any such signal to controller 114, thereby removing all control from other users (including users of computing devices 126 and 128). When this occurs, the MAP application will cause a notification to be displayed on the computing devices. When the remote control device is turned off, the MAP application will enable a user to restart the task on one of computing devices 126 and 128.

Rear compartment 204 also includes a blue flashing indicator light 212 positioned on top of the compartment and a warning beeper 210 positioned underneath rear bumper 208, as shown, which are activated whenever compactor 200 is operating in the autonomous mode (e.g., when compactor 200 is executing a task requested by one of computing devices 126 and 128).

Referring still to FIG. 2A, a number of the components shown in FIG. 1 are housed within rear compartment 204, including robotics processing unit 110, vehicle control unit 112, ultrasonic ECU 118, antennas for GPS receivers 124, and antennas that enable communication with the Wi-Fi transceiver and/or cellular transceiver of computing devices 126 and 128. These components are preferably housed within a ruggedized enclosure that provides isolated interfaces to each of the components.

Referring now to FIG. 2B, compactor 200 further includes an angle sensor assembly with a rotary position sensor 216 that is utilized to determine the steering angle between front compartment 202 and rear compartment 204.

In this embodiment, as shown in FIG. 5, front compartment 202 includes a frame plate 218 that supports a hinge 220 and, similarly, rear compartment 204 includes a frame plate 222 that supports a hinge 224. Hinge 220 is pivotally connected to hinge 224 via a hinge pin 226 with a pin head 228 and pin locator 230. A mounting block 232 is provided to support rotary position sensor 216. In this embodiment, rotary position sensor 216 comprises the RTY360LVNAX rotary potentiometer available from Honeywell International Inc. of Charlotte, North Carolina Rotary position sensor 216 is configured to provide a position feedback signal of the rotating hinge pin 226 to robotics processing unit 110, which uses this information to determine the steering angle between front compartment 202 and rear compartment 204 in a manner known to those skilled in the art.

Figure 6:
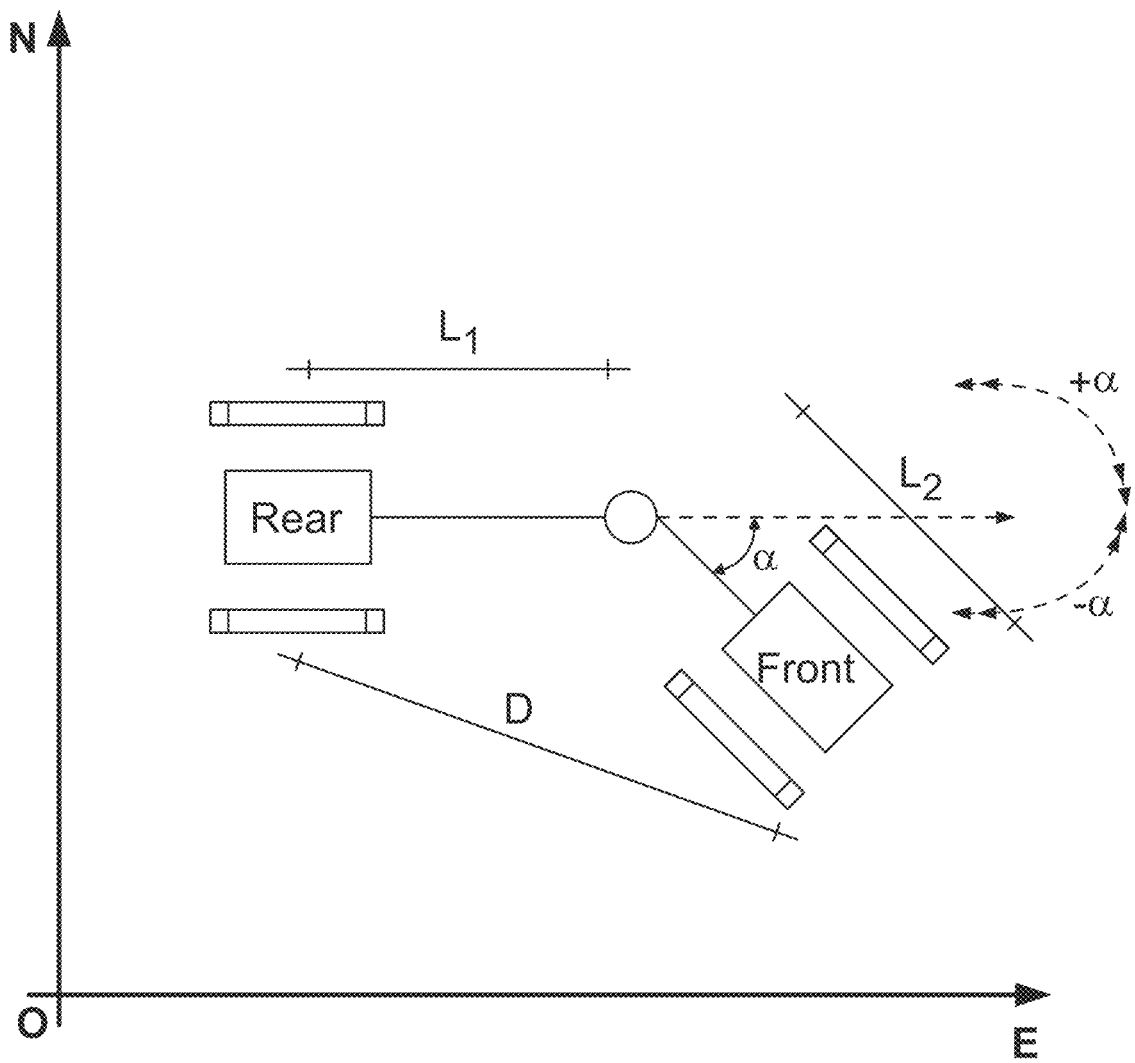
FIG. 6 is a diagram showing the positions of the GPS receivers within the front and rear compartments of the compactor shown in FIGS. 2A and 2B, wherein the GPS receivers are used to determine the steering angle of the compactor.

The steering angle between front compartment 202 and rear compartment 204 may also be determined using the GPS receivers located underneath the front and rear hoods of front compartment 202 and rear compartment 404 (wherein the GPS receiver of the rear compartment will be referred to as GPS1 and the GPS receiver of the front compartment will be referred to as GPS2). With reference to FIG. 6, the distances and angles used to determine the steering angle are shown in Table 1 below:

TABLE 1

| | |
|---|---|
| $L_1$ | Distance from vehicle joint to $GPS_1$ along the center line of the vehicle axis (meters) |
| $L_2$ | Distance from vehicle joint to $GPS_2$ along the center line of the vehicle axis (meters) |
| D | Linear distance between $GPS_1$ and $GPS_2$ (meters) |
| $\dot{D}$ | Rate of change in the linear distance (meters/second) |
| α | Vehicle steering angle (degrees) |
| $\dot{\alpha}$ | Rate of change of steering angle (degrees/second) |
| ΔE | Error in steering angle |
| θ | Degree offset from north to the vehicle's heading (degrees) |
| $\dot{\theta}$ | Rate of change of the vehicle's absolute orientation (degrees/second) |
| V | Velocity of the vehicle's forward axis (meters/second) |
| $GPS_{1N}$ | distance of $GPS_1$ from reference point in the north direction (meters) |
| $GPS_{2N}$ | distance of $GPS_2$ from reference point in the north direction (meters) |
| $GPS_{1E}$ | distance of $GPS_1$ from reference point in the east direction (meters) |
| $GPS_{2E}$ | distance of $GPS_2$ from reference point in the east direction (meters) |

The linear distance between $GPS_1$ and $GPS_2$ may be determined from the following equation:

$$D = \sqrt{(GPS_{1N} - GPS_{2N})^2 + (GPS_{1E} - GPS_{2E})^2}$$

Further, the absolute steering angle may be determined from the following equation:

$$|\alpha| = \cos^{-1}\left(\frac{-D^2 + L_2^2 + L_1^2}{2L_1 L_2}\right) \quad (2)$$

The direction of the steering angle may be determined based on the change in measured variables (i.e., distance vector, input commands (left, right, forward, reverse), and angular rate), as shown in the if/then statements shown below:

if sign ($\alpha[t-1]$) = none & $V = 0$ & $\dot\alpha = 0$ then  (3)

Undefined if sign ($\dot\alpha$) > 0 then  (4)

if $\dot D > 0$ then sign ($\alpha$) = −1 if $\dot D > 1$ then sign ($\alpha$) = 1 if $V > 0$ then  (5)

if $\dot\theta > 0$ then sign ($\alpha$) = −1 if $\dot\theta \le 0$ then sign ($\alpha$) = 1 if $V < 0$ then  (6)

if $\dot\theta \ge 0$ then sign ($\alpha$) = 1 if $\dot\theta < 0$ then sign ($a$) = −1 if $|D - (L_1 + L_2)| \le \Delta E$ then  (7)

$\alpha = 0$ & sign ($\alpha$) = 1

In this embodiment, the use of both the rotary position sensor 216 and the GPS receivers to determine the steering angle between front compartment 202 and rear compartment 204 provides several advantages. For example, one skilled in the art will understand that a rotary position sensor (e.g., rotary potentiometer) must typically be manually calibrated. Here, the GPS receivers are used to calibrate the rotary position sensor, thus eliminating the manual calibration step. Also, the rotary position sensor and the GPS receivers may be used to refine the guidance, navigation and control algorithms. Further, the use of both the rotary position sensor and the GPS receivers provides redundancy and, if the steering angles determined from the two methods differ by more than a predetermined margin, the system may provide an alert to check the sensors. Of course, it should be understood the system may utilize only one of these methods to determine the steering angle or may use one or more different methods within the scope of the invention.

Figure 7:
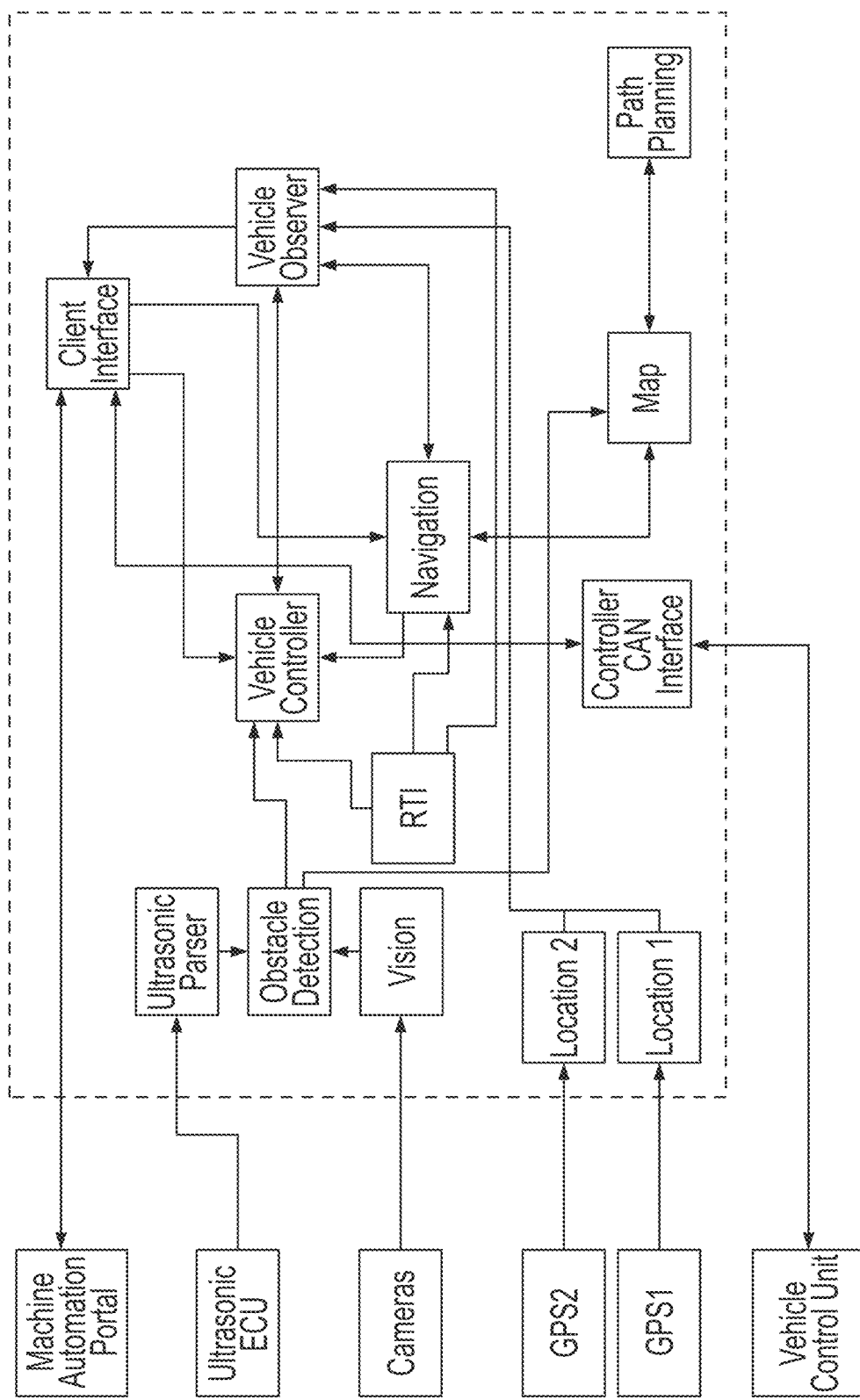
FIG. 7 is a block diagram of the software processes implemented on the robotics processing unit of the system of FIG. 1.

Referring now to FIG. 7, a block diagram is provided to illustrate the software processes implemented on robotics processing unit 110 of system 100. In this embodiment, the software processes are generally described below.

Client Interface: This process manages the state of various clients connecting and disconnecting from the vehicle (e.g., the MAP applications residing on one or both of computing devices 126 and 128) and routes incoming and outgoing messages appropriately.

Ultrasonic Parser: This process receives the sensor data from ultrasonic ECU 118 and converts the binary CAN data into a JSON object.

Vision: This process receives the camera frames from 3D depth cameras 122 and converts the depth data into a 3D point cloud.

Locations 1 and 2: These processes receive the GPS data from GPS receivers 124 and convert the proprietary binary into a JSON object.

Controller CAN Interface: This process receives vehicle data from vehicle control unit 112 and converts the proprietary binary into a JSON object.

Path Planning: This process handles requests from vehicle navigation to plan a route (referred to as a "command path") that will cover the autonomous operating zone defined by the user.

Obstacle Detection: This process is used to filter the 3D point cloud from 3D depth cameras 122 and broadcast the coordinates of obstacles detected within pre-defined user thresholds.

Map: This process is responsible for holding all information regarding the state of the physical world and vehicles operating within that world, such as the location of one or more operational areas and/or exclusion zones, the position of any detected obstacles, the position of each vehicle, the elevation, the compaction level, etc.

In the exemplary embodiment, the information is stored in association with cells of a map grip. FIG. 14 is an exemplary map grid showing the cells oriented in a north-east-down (NED) coordinate system, wherein North is positioned on the x-axis and East is positioned on the y-axis. The resolution may vary between different implementations—e.g., each cell is 0.5 meters along the x-axis and 0.5 meters along the y-axis in this embodiment. As can be seen, each cell includes information on whether the boundary of the autonomous operating zone is located within that cell (i.e., boundary=true or false), information on whether the boundary of an exclusion zone is located within that cell (i.e., keepout—true or false), the elevation of that cell, and the compaction level of that cell. Of course, other types of information may be stored in association with each cell, such as information on whether a detected obstacle is located within that cell, information on whether the vehicle is located within that cell, and any other types of information to be displayed to the user. It should be understood that the invention is not limited to the types of information shown in FIG. 14, and that a variety of different types of information may be stored as needed for a particular implementation.

Vehicle Controller: This process manages the sending of commands for left, right, forward, straight, idle, vibration, engine state and manual control from the MAP application.

Vehicle Observer: This process fuses the GPS, accelerometer and other sensor and state data from any sub-system to combine it into a single source of truth for the vehicle's position, orientation and current operating state.

Real Time Interface (RTI): This process manages the timing of all processes in the main control loop. This process also sends a message to each process when it should start processing once per the control loop cycle (e.g., 10 Hz).

Navigation: This process responds to the command path and manages the sending of waypoints to the control module in order to drive the path (e.g., a new waypoint is sent to the control module when a waypoint is achieved). This process also manages the internal task state when received from the map process (e.g., No Task, Task Received, Task Started, Task Paused, Task Blocked, Task Updated, Task Rerouting, Task Completed). In addition, this process is responsible for requesting new command paths when blocked.

Of course, it should be understood that the software processes shown in FIG. 7 are examples and that one or more of these processes may not be performed by robotics processing unit 110 and/or one or more additional processes may be performed by robotics processing unit 110. Further, it should be understood that one or more of the above software processes may be performed by another component. For example, the map and path planning processes may alternatively be performed by a central robotics processing unit located on the same Wi-Fi network or LTE network that is used for communications between robotics processing unit 110 and computing devices 126 and 128. This option may be preferred for implementations that involve the operation of multiple vehicles, as described below, in order to provide centralized map and path planning processes.

Figure 12:
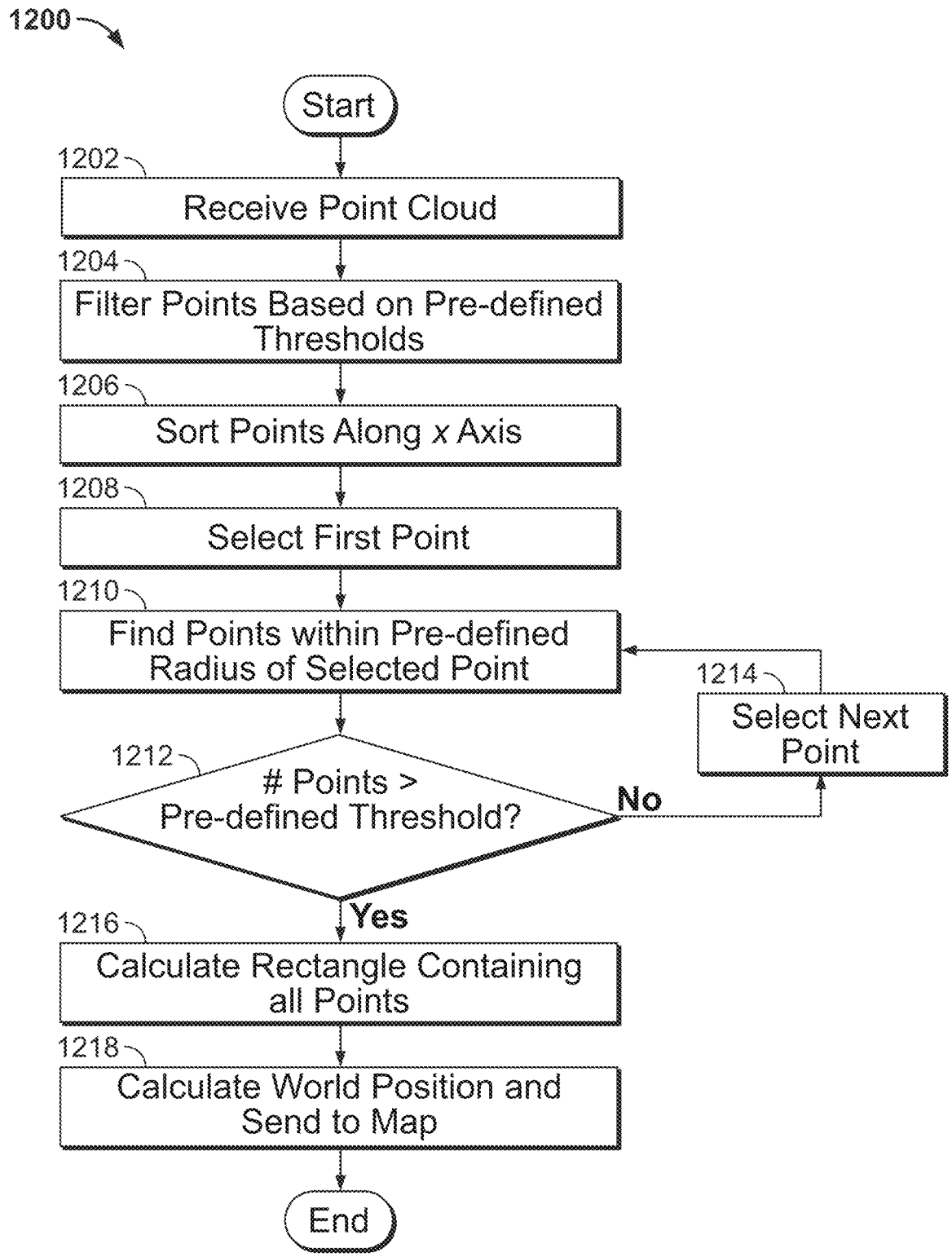
FIG. 12 is a flow chart of a method for detecting an obstacle using the system of FIG. 1.
Figure 13:
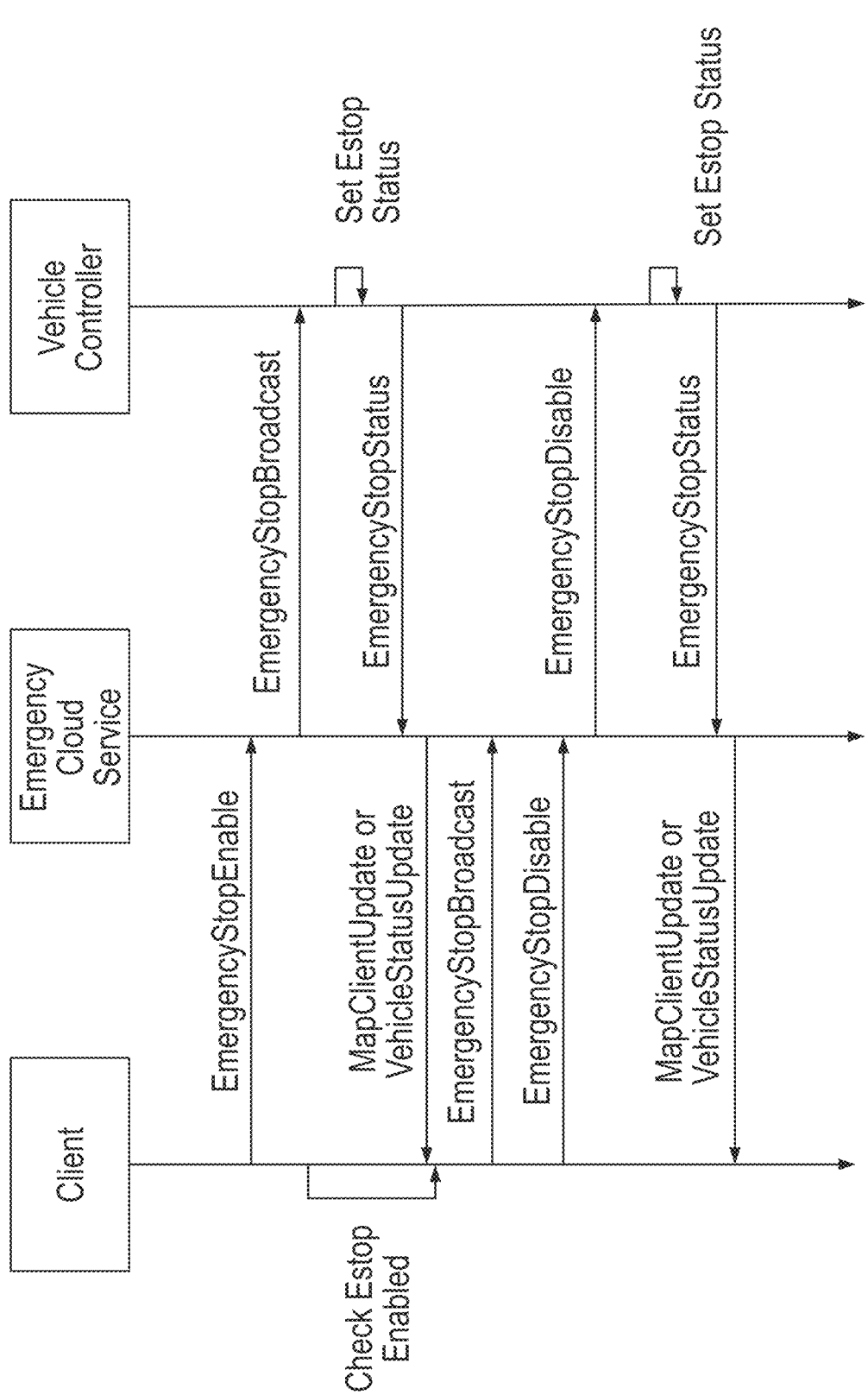
FIG. 13 is a message flow diagram of a method for enabling and disabling an emergency stop of a vehicle using the system of FIG. 1.

As will now be described in greater detail below, the different components of system 100 of FIG. 1 (including robotics processing unit 110 and the software processes shown in FIG. 7) are used to perform various methods, including submission of a boundary and update of that boundary upon detection of an obstacle (FIG. 8), autonomous performance of a vehicle task (FIGS. 9 and 10), control of the vehicle (FIGS. 11a and 11B), detection of an obstacle in the vehicle's path (FIG. 12), and emergency stop of the vehicle (FIG. 13).

Figure 8:
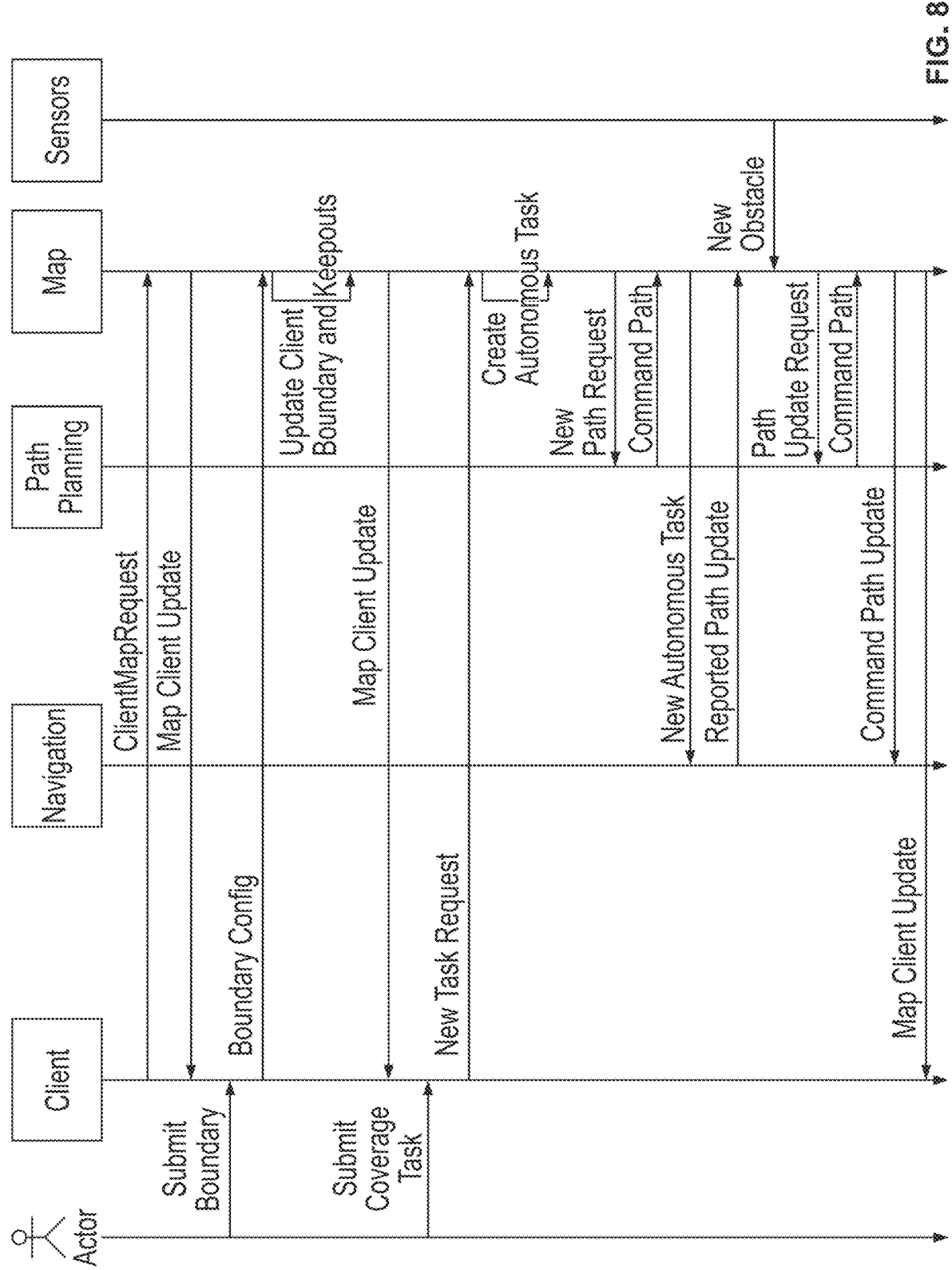
FIG. 8 is a message flow diagram of a method for submitting a boundary and coverage task and updating the boundary upon detection of an obstacle using the system of FIG. 1.

Referring to FIG. 8, a method for submitting a boundary and updating the boundary upon detection of an obstacle is shown. As can be seen, the steps of this method are performed by different components of system 100, including the MAP application residing on computing device 126 ("Client"), the navigation process of robotics processing unit 110 ("Navigation"), the path planning process of robotics processing unit 110 ("Path Planning"), the map process of robotics processing unit 110 ("Map"), and the environmental sensors, namely, ultrasonic ECU 118 with ultrasonic sensors 120 and 3D depth cameras 122 ("Sensors").

First, when the user accesses the MAP application on computing device 126, a map request (Client Map Request) is transmitted to the map process of robotics processing unit 110 for generation of a map, and the map process returns the current map (Map Client Update) to the MAP application. In this embodiment, the map is generated using aerial satellite photography and/or drone imagery, although other map generation techniques known to those skilled in the art may also be used. The MAP application provides a graphical user interface configured to present the map on the display of computing device 126.

The user then uses the MAP application on computing device 126 to define a boundary for one or more operational areas. For example, an operational area may comprise an outer geo-fence representing the maximum extent of the area in which the vehicle is permitted to operate. The outer geo-fence may, for example, represent the boundaries of a work site. In one embodiment, the user defines the outer geo-fence by selecting a region on the map presented on the display of computing device 126. In another embodiment, the outer geo-fence is predefined for a given work site and applied to any task definition generated by a computing device for execution at that site.

An operational area may also comprise an autonomous operating zone. The autonomous operating zone is typically smaller than the outer geo-fence (although it may encompass up to the same area as the outer geo-fence) and defines the boundaries of the task to be autonomously performed by the vehicle. For example, in the exemplary embodiment, the autonomous operating zone defines an area of the work site to be compacted by the compactor. The user defines the autonomous operating zone by selecting a region on the map presented on the display of computing device 126.

The MAP application on computing device 126 also enables a user to define a boundary for one or more exclusion zones (i.e., keepouts). An exclusion zone is an area within the autonomous operating zone that the vehicle is not permitted to enter (e.g., an area containing buildings or other obstacles). The user defines an exclusion zone similarly to the autonomous operating zone, e.g., by selection of a region on the map presented on the display of computing device 126. As described below, the path planning process is configured to generate paths that do not enter the exclusion zones.

As discussed above, the user defines each operational area (e.g., outer geo-fence and/or autonomous operating zone) and exclusion zone by selecting a region on the map presented on the display of computing device 126. There are various methods that may be used to define each operational area or exclusion zone.

In one embodiment, the MAP application enables the user to accurately place three or more markers on the map to create the boundary for each operational area and exclusion zone. Lines are then drawn to connect the markers within the graphical user interface to thereby depict the boundary for the operational area or exclusion zone on the map. These lines may also be labeled with distances so that the user can ensure the accuracy of the scale down to the centimeter. The shape of the boundary can be a simple triangle (if three markers are placed by the user), a square or rectangle (if four markers are placed by the user), or a complex polygon (if five or more markers are placed by the user).

In another embodiment, the user (holding computing device 126) walks along the intended path of the boundary while computing device 126 continuously transmits GPS coordinates (i.e., digital breadcrumbs) to define the location of the boundary. Lines are then drawn to connect the GPS coordinates within the graphical user interface to thereby depict the boundary for the operational area or exclusion zone on the map. If necessary, the lines are smoothed out and may also be labeled with distances so that the user can ensure the accuracy of the scale down to the centimeter.

In yet another embodiment, the current location of compactor 200 is used as a reference point and the user inputs a distance from compactor 200 for use in placing the markers on the map. Lines are then drawn to connect the markers within the graphical user interface to thereby depict a boundary for the operational area or exclusion zone on the map. Each line segment can be set to a custom length that is input by the user.

Figure 17:
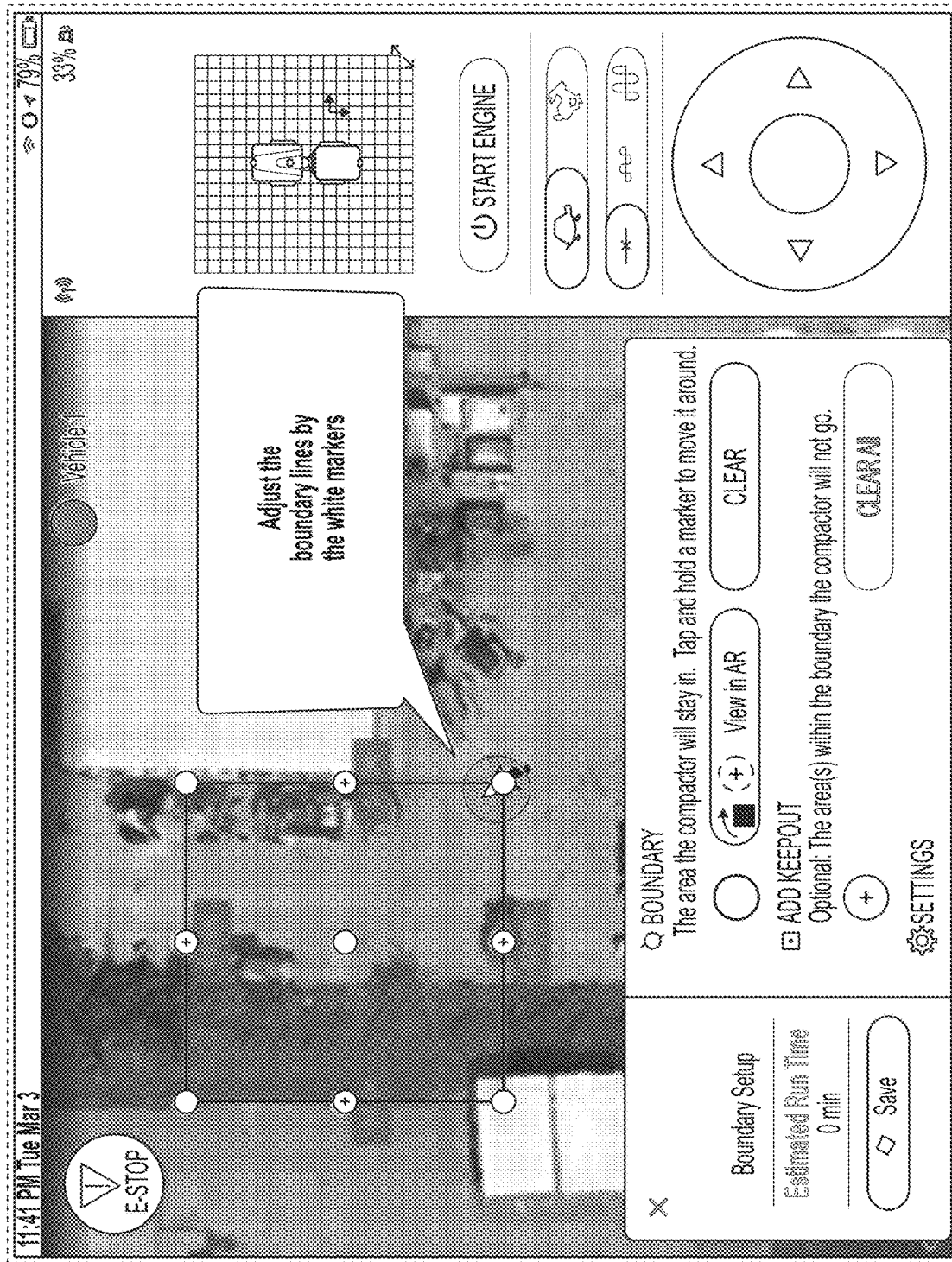
Figure 19:
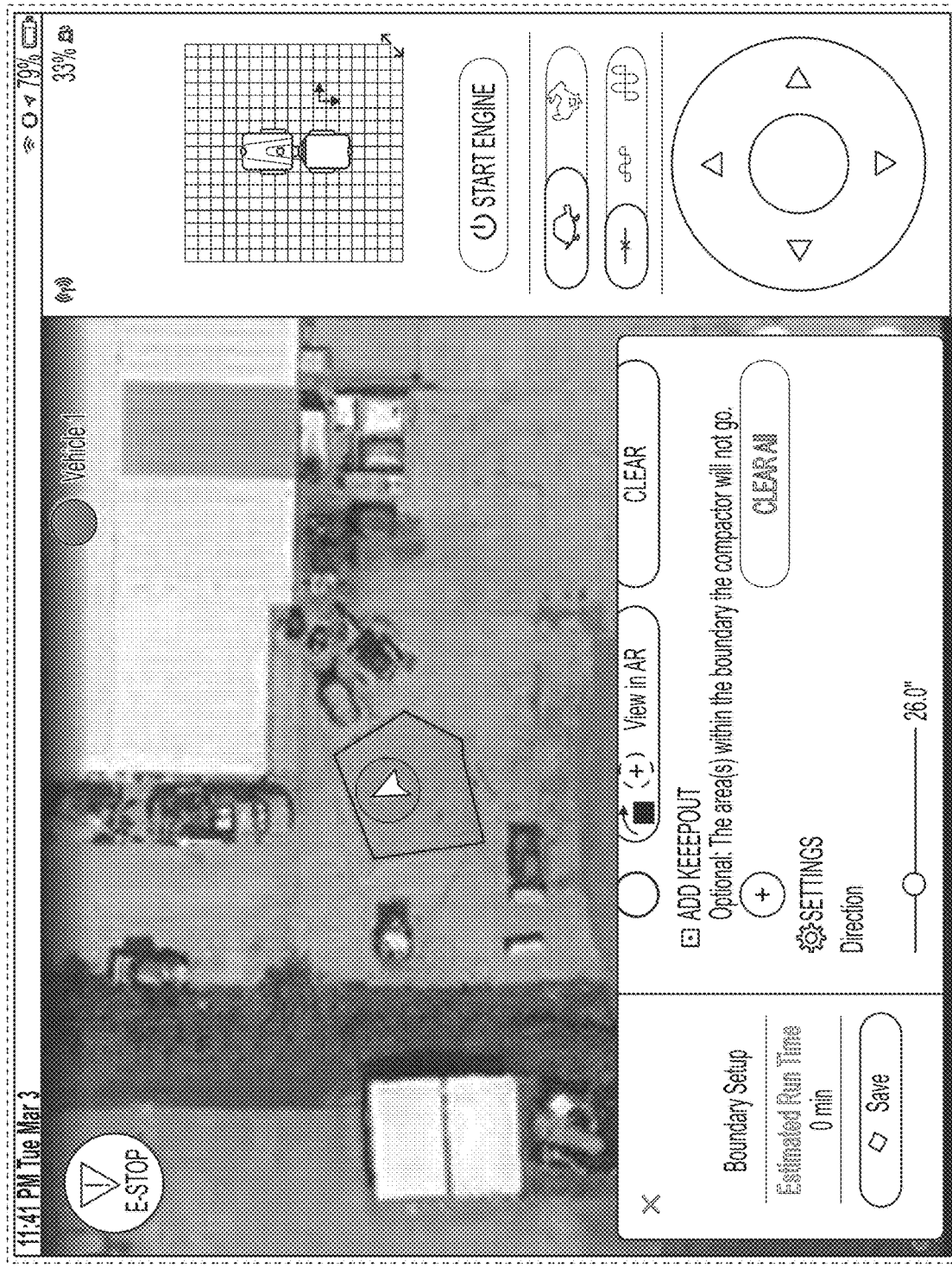

For all of the embodiments described above, the coordinates of each marker on the map can be individually adjusted to meet exact requirements. For example, FIG. 17 is an exemplary screen shot of the MAP application showing various white markers that define an initial boundary for an autonomous operating zone. As can be seen, a user may move these white markers around to adjust the boundary line as desired. FIG. 19 is an exemplary screen shot of the MAP application showing the final boundary for the autonomous operating zone after adjustment of the white markers. This same process may also be used to define one or more exclusion zones (i.e., keepouts). Preferably, modifications may be made to the coordinates of each marker whenever the vehicle is not operating in autonomous mode. As shown in FIG. 8, when a boundary is established, or later modified, for each operational area and exclusion zone, the boundary configuration (Boundary Config) is transmitted to the map process of robotics processing unit 110 for generation of a map with the defined boundaries (Update Client Boundary and Keepouts), and the map process returns the updated map to the MAP application (Map Client Update). The graphical user interface of MAP application is configured to present the updated map on the display of computing device 126.

Figure 18:

The MAP application also provides an augmented reality (AR) mode that enables a user to visualize the virtual boundary of the autonomous operating zone superimposed on a real world view of the area. Specifically, after the boundary has been established, the user can initiate the AR mode by selecting "View in AR" as shown in FIGS. 17 and 19, which causes the camera of computing device 126 to show the real world view of the area with a digital overlay of the boundary of the autonomous operating zone. FIG. 18 is an exemplary screen shot of the MAP application in AR mode in which the boundary (i.e., the dark-shaded boundary with white post markers) is shown as a digital overlay on the real world view of the autonomous operating zone. In this example, the compactor will stop and reverse direction when it reaches the boundary. Thus, there is a synergy between the compactor's actions to interact with and/or change the physical world and the ability of the AR view to display such actions.

In the exemplary embodiment, the MAP application provides the AR view by using image and object detection to observe the vehicle's location in the real world view for use as a reference point. Then, using the GPS coordinates and heading information supplied by the vehicle over the wireless network connection, the MAP application draws each boundary in a way that accurately depicts where the coordinates of that boundary are located in the camera's real world view. For example, with reference to FIG. 14, assume that compactor 200 is located in cell (2, 3) (i.e., row 2, column 3) and that the resolution of the grid is 0.5 meters (i.e., each cell is 0.5 meters along the x-axis and 0.5 meters along the y-axis). The location of the compactor (e.g., identified from Apple's ARKit) may then be used to draw the boundary from the grid offset—e.g., marking the top boundary at 0.5 meters north (corresponding to cell (1, 3)), the left boundary at 1 meter west (corresponding to cell (2, 1)), the right boundary at 1 meter east (corresponding to cell (2, 5)), and the bottom boundary at 1.5 meters south (corresponding to cell (5, 3)). Thus, instead of relying on aerial satellite photography that may be out-of-date, too pixelated, or too obfuscated to accurately determine where the coordinates meet real world locations, the user can see the real world view of the exact area where the vehicle will be allowed to operate autonomously.

Referring back to FIG. 8, the user next accesses the MAP application on computing device 126 to submit a coverage task, which may include a task type and/or task details. It can be appreciated that the task types and task details will be dependent on the nature and capabilities of the vehicle.

For example, for the compactor of the exemplary embodiment, the task type may comprise a compacting task (i.e., compact the ground by driving over each square inch in the area of the autonomous operating zone) and the task details may comprise, for example, the compaction level, the path orientation (e.g., 0-90°), the vehicle speed, and the obstacle detection size based on terrain roughness. For example, the screen shot of FIG. 19 shows a menu system that enables a user to select the vibration magnitude (via selection of one of the ISO standard icons for off, low, and high), the path orientation (using the slideable scale), and the vehicle speed (via selection of one of the ISO standard icons for slow and fast). Also, the settings mode may be accessed to display the menu system shown in FIG. 25, which enables a user to select the obstacle detection size (via selection of one of the small, medium or large buttons) and the type of measurement units.

The task type may also comprise a point-to-point travel task (i.e., travel from the current location of the vehicle to a target location within the autonomous operating zone, as specified by computing device 126, while avoiding any obstacles located along the path). In addition, the task type may comprise a follow-me task in which the compactor closely trails computing device 126 running the MAP application, or a trench mode task in which the compactor navigates inside a deep drench where the sensors continually detect the sides of the trench but do not treat such sides as obstacles that prevent the compactor from moving. Various other task types will be apparent to those skilled in the art, such as a grading task for a vehicle with a blade or bucket.

Once the task has been defined, the MAP application on computing device 126 transmits a new task request (New Task Request) to the map process of robotics processing unit 110. The map process creates the autonomous task based on the task definition (Create Autonomous Task) and transmits a new path request (New Path Request) to the path planning process. The path planning process generates a command path within the autonomous operating zone by performing a set of best-effort heuristics to decompose the space into "plowable" subsections, as known to those skilled in the art (i.e., the process is a form of Morse convex cellular decomposition known as Boustrophedon cellular decomposition). The generated command path (Command Path) is then transmitted to the map process, which transmits a new autonomous task (New Autonomous Task) to the navigation process.

As the vehicle performs the autonomous task (which will be described in greater detail below in connection with FIGS. 9 and 10), the navigation process reports path updates (Reported Path Update) to the map process. The environmental sensors (i.e., the ultrasonic sensor system and/or 3D depth cameras) are used to detect obstacles positioned on the command path (New Obstacles), as described in greater detail below in connection with FIG. 12. Upon detection of an obstacle, the map process transmits a request for an updated path (Path Update Request) to the path planning process, and the path planning process returns an updated command path (Command Path). The map process then transmits the updated command path (Command Path Update) to the navigation process, and also transmits a map update with one or more dynamically-generated exclusion zones (Map Client Update) to the MAP application for display on computing device 126. Any dynamically-generated exclusion zone can be overridden (i.e., deleted) by a user of computing device 126 (e.g., upon visual confirmation by the user that no obstacle exists, or that the obstacle is sufficiently small that the vehicle can safely ignore it). In that case, the vehicle will be allowed to drive over that area on a future pass.

It should be noted that, in the exemplary embodiment, the compactor continues to operate upon detection of an obstacle—i.e., the command path is merely updated to avoid the obstacle. In other embodiments, the compactor may pause upon detection of an obstacle and wait for input from the user as to whether to override the dynamically-generated exclusion zone, as described above. Of course, these embodiments would require more manual intervention and, thus, may not be preferred for some implementations.

Figure 9:
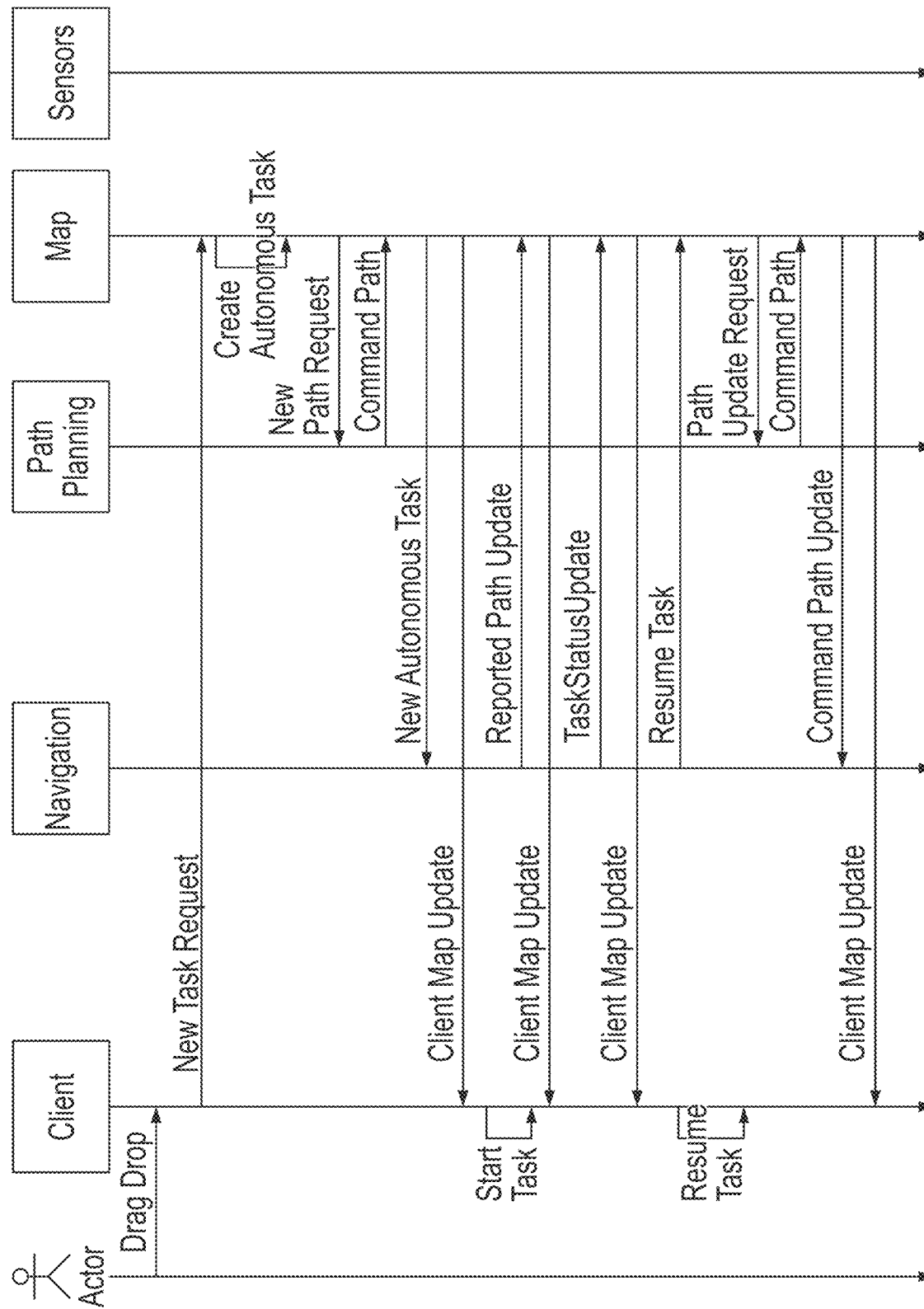
FIG. 9 is a message flow diagram of a method for autonomously performing a task using the system of FIG. 1.

Referring now to FIG. 9, a method for autonomously performing a vehicle task is shown. As can be seen, the steps of this method are performed by different components of system 100, including the MAP application residing on computing device 126 ("Client"), the navigation process of robotics processing unit 110 ("Navigation"), the path planning process of robotics processing unit 110 ("Path Planning"), and the map process of robotics processing unit 110 ("Map") (note that the environmental sensors ("Sensors") are not involved in this method).

Figure 20:
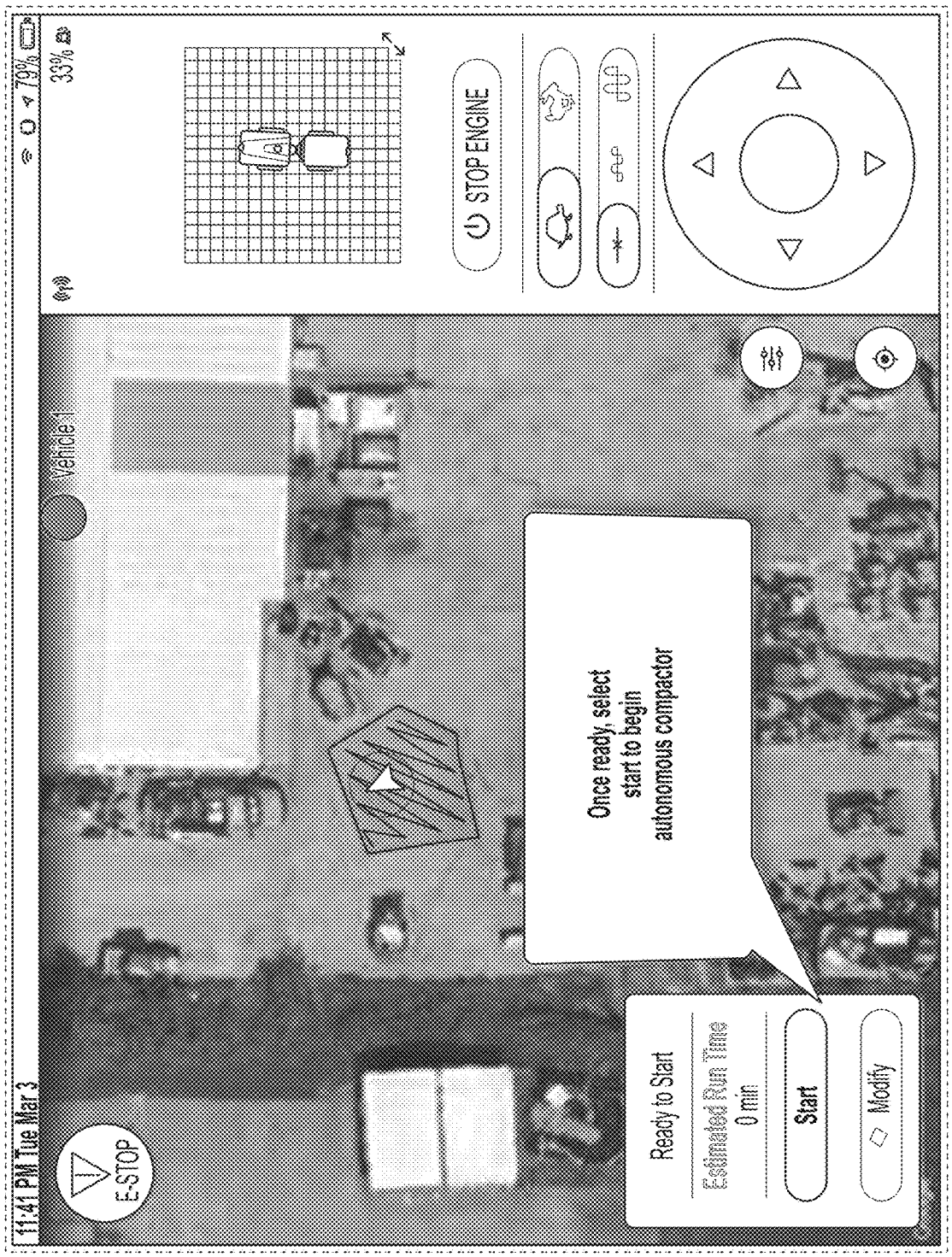
Figure 21:
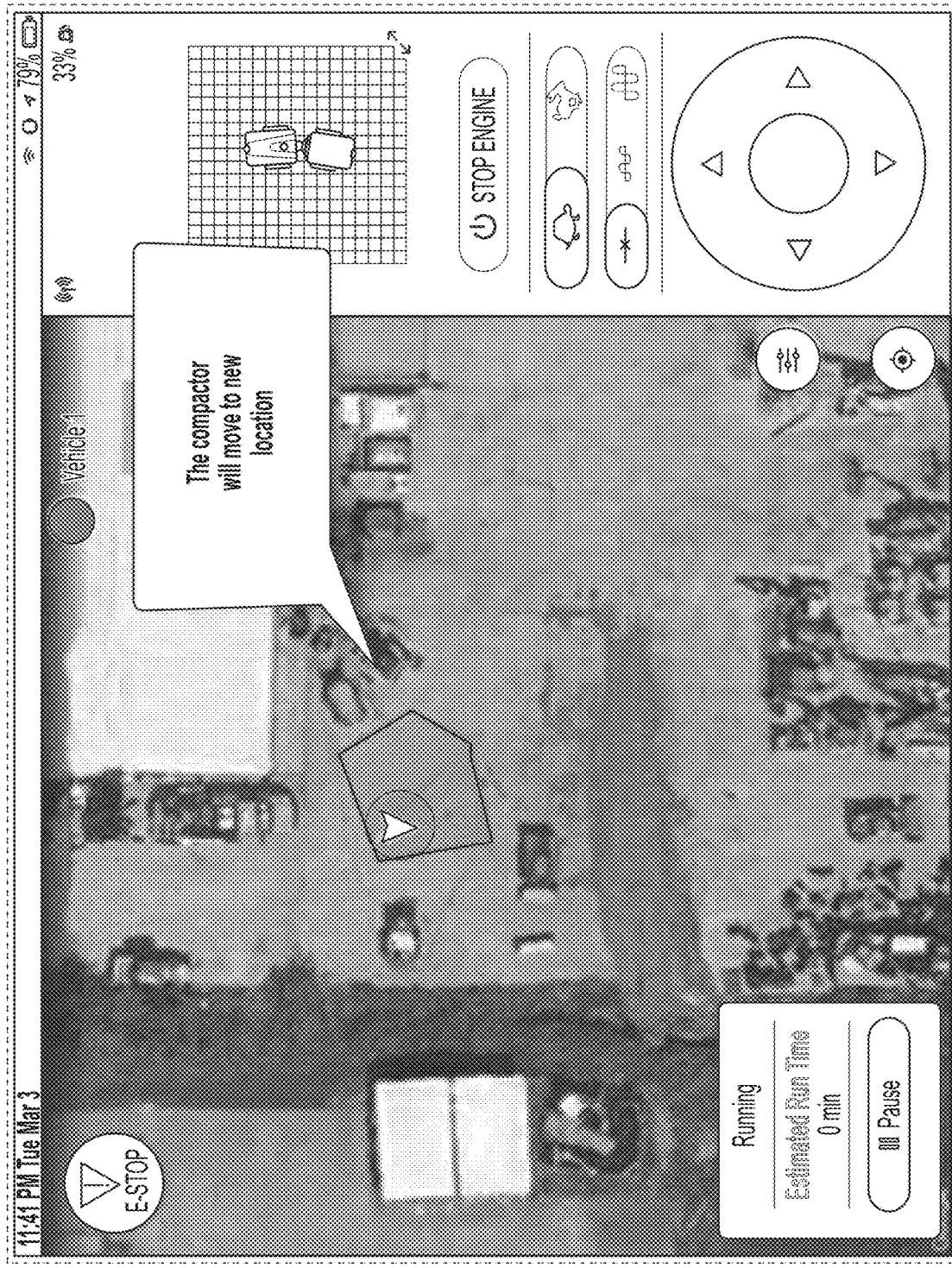

As discussed above, once the task has been defined (e.g., a compaction task or a point-to-point travel task), the MAP application on computing device 126 transmits a new task request (New Task Request) to the map process of robotics processing unit 110. The map process creates the autonomous task based on the task definition (Create Autonomous Task) and transmits a new path request (New Path Request) to the path planning process. The path planning process generates a command path within the autonomous operating zone, as described above, and the generated command path (Command Path) is transmitted to the map process. The map process then transmits a new autonomous task (New Autonomous Task) to the navigation process, and also transmits a map update with the command path (Client Map Update) to the MAP application for display on computing device 126. FIG. 20 is an exemplary screen shot of the MAP application showing the boundary for the autonomous operating zone with the generated command path. The user may then start the autonomous task by selecting the Start Engine button on the display of computing device 126 (see FIGS. 17 and 19) to start the engine of the compactor, and then selecting the Start button on the display of computing device 126 (see FIG. 20). The compactor will then move to a new location to begin the autonomous task, as indicated in the exemplary screen shot of the MAP application shown in FIG. 21. It should be noted that the user may select the Stop Engine button on the display of computing device 126 (see FIGS. 20, 21 and 22) at any time during operation of the compactor in order to stop the engine of the compactor. The Stop Engine action is different than the emergency stop feature (described below) insofar as the user may select the Start Engine button to immediately restart the engine of the compactor.

Figure 10:
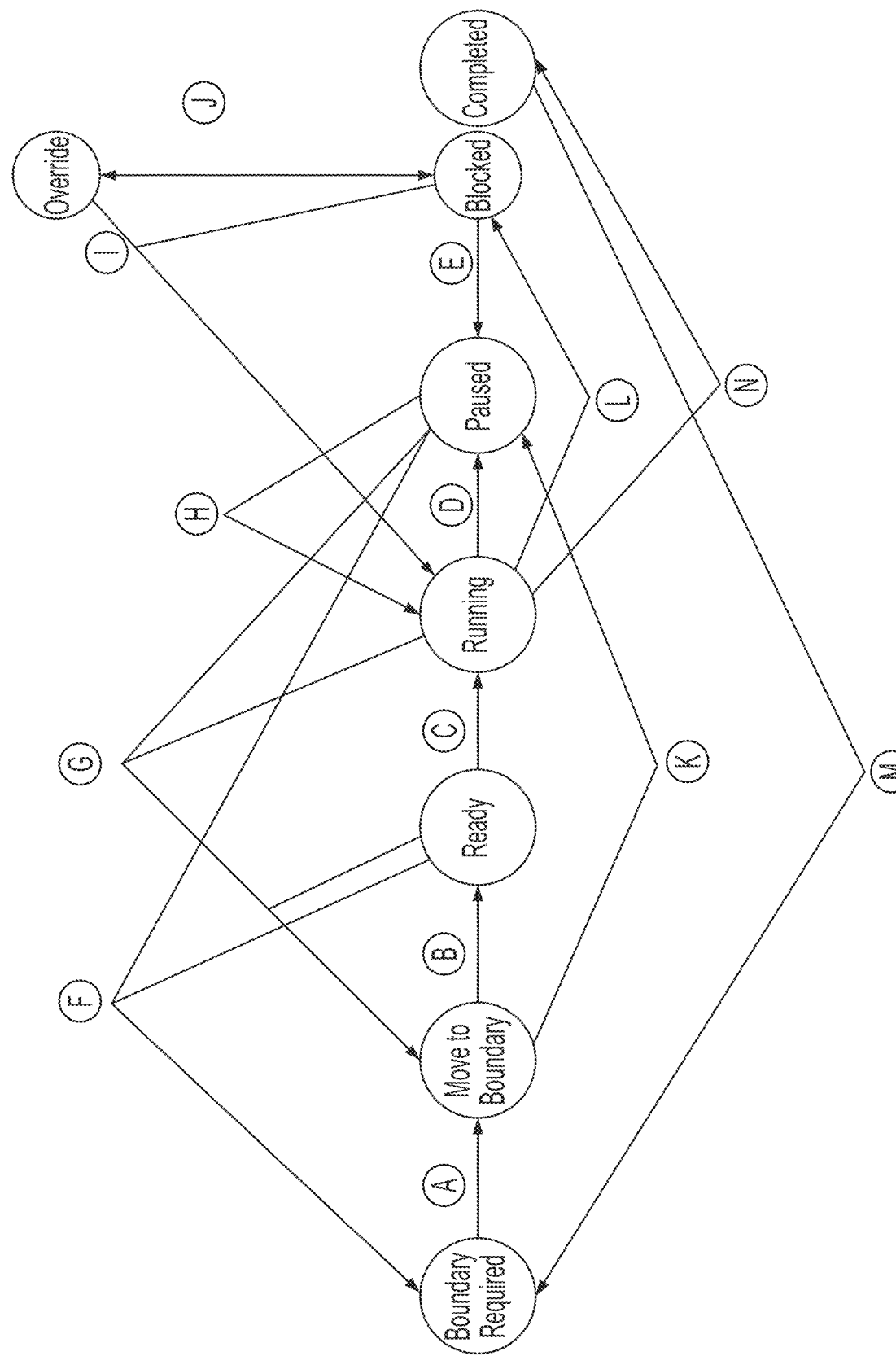
FIG. 10 is a diagram showing the autonomous state transitions of a vehicle during the performance of a task.

In the exemplary embodiment, the operational states of a compactor while performing an autonomous task (i.e., "Ready," "Running," "Paused," "Boundary Required," "Move to Boundary," "Blocked," "Override," or "Completed") are shown in FIG. 10. Movement from one operational state to another is dependent on a number of factors, including the navigation state (which includes "Has Boundary," "In Boundary," "Path Started," and "Path Completed") and the control state (which includes "Automatic," "Manual or Idle," "Override," and "Blocked"), as shown in Table 2 below.

TABLE 2

| | |
|---|---|
| Boundary Required to Move to Boundary (A) | Navigation State: Has Boundary = True |
| Move to Boundary to Ready (B) | Navigation State: Path Started = False AND Has Boundary = True AND In Boundary = True Control State: Manual or Idle = True |
| Ready to Running (C) | Control State: Automatic = True |
| Running to Paused (D) | Control State: Manual or Idle = True Navigation State: Path Started = True |
| Blocked to Paused (E) | Control State: Manual or Idle = True Navigation State: Path Started = True |
| Ready or Paused to Boundary Required (F) | Clear Boundary |
| Running or Paused to Move to Boundary (G) | Navigation State: In Boundary = False |

TABLE 2-continued

| | |
|---|---|
| Paused to Running (H) Blocked or Override to Running (I) | Control State: Automatic = True Obstacle Clears |
| Blocked to Override (J) | Control State: Override = True |
| Move to Boundary to Paused (K) | Control State: Manual or Idle = True Navigation State: Path Started = True |
| Running to Blocked (L) | Control State: Blocked = True |
| Completed to Boundary Required(M) | Navigation State: Has Boundary = False |
| Running to Completed (N) | Navigation State: Path Completed = True |

Of course, it should be understood that the operational states and factors that determine movement from one operational state to another will vary between different types of equipment and/or different implementations.

Referring back to FIG. 9, as the task progresses (e.g., a compaction task or a point-to-point travel task), the navigation process provides path and status updates (Reported Path Update, Task Status Update) to the map process. The updates may include, for example, a current location of the vehicle, as well as any dynamically-generated exclusion zones (as described above). The updates may also include an indication of the path being travelled by the vehicle and, in the case of a compaction task, which portions of the path have been completed. A map update (Client Map Update) is than transmitted to the MAP application for display on computing device 126.

Figure 22:
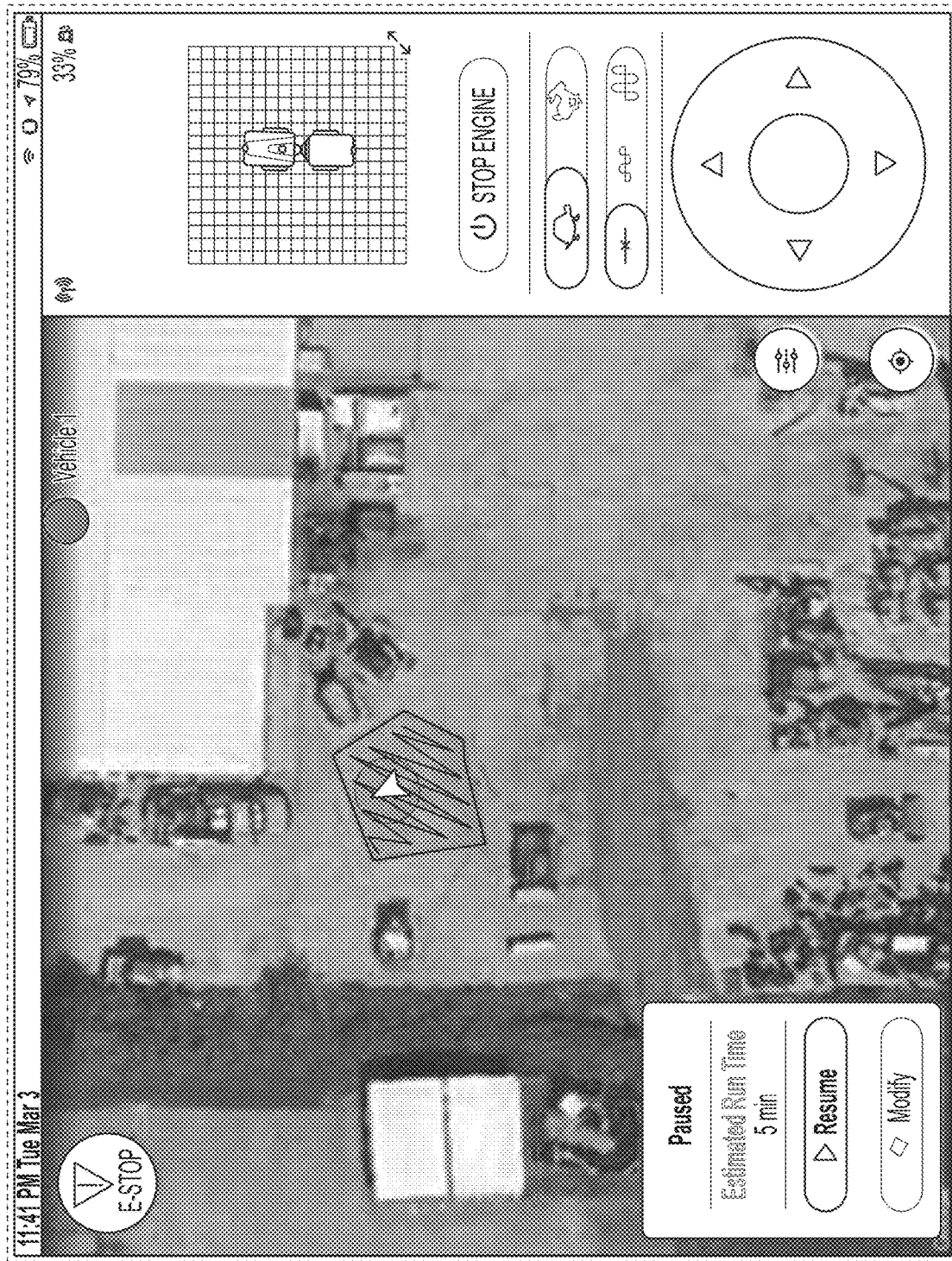

If the compactor is paused during operation of a task, as indicated in the exemplary screen shot of the MAP application shown in FIG. 22, the user may resume the autonomous task by selecting the Resume button on the display of computing device 126. The navigation process then transmits a message to resume the task (Resume Task) to the map process. Upon receipt of this message, the map process transmits a request for an updated path (Path Update Request) to the path planning process, and the path planning process returns an updated command path (Command Path). The map process then transmits the updated command path (Command Path Update) to the navigation process, and also transmits a map update (Client Map Update) to the MAP application for display on computing device 126.

For a compaction task, the MAP application may also receive data from the compactor about elevation and terrain roughness. The data is visualized in a color gradient from red-yellow-green-blue (from the highest areas to the lowest areas) to generate an elevation heatmap. Calculations may also be performed on this data in order to display how much aggregate material can be removed from certain areas or added to other areas to obtain a flatter compaction. This data may also be visualized in the AR mode so that millimeter-level accuracy can be obtained when the data is overlaid on the real world view from the camera of computing device 126, as discussed above.

Figure 23:
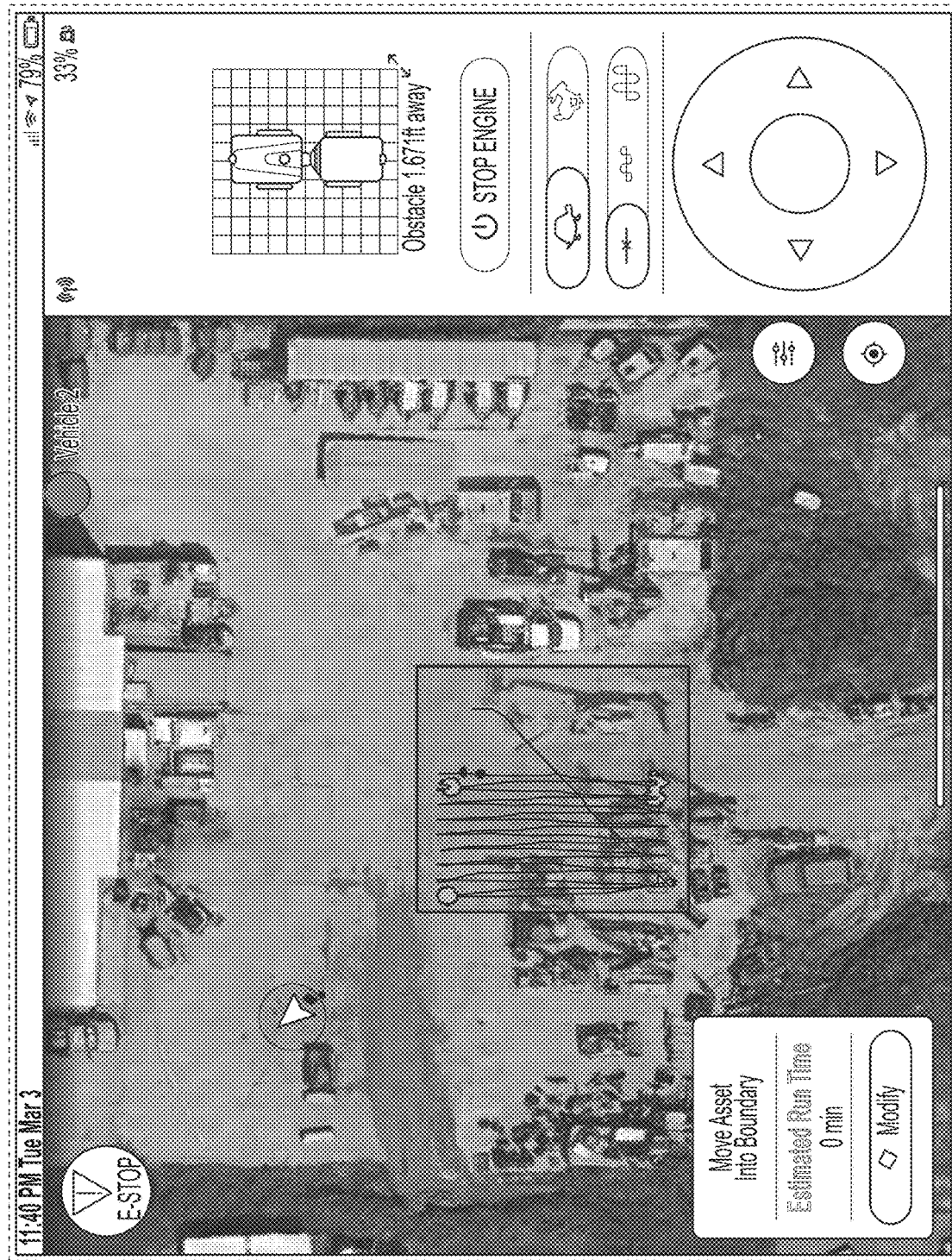
Figure 24:
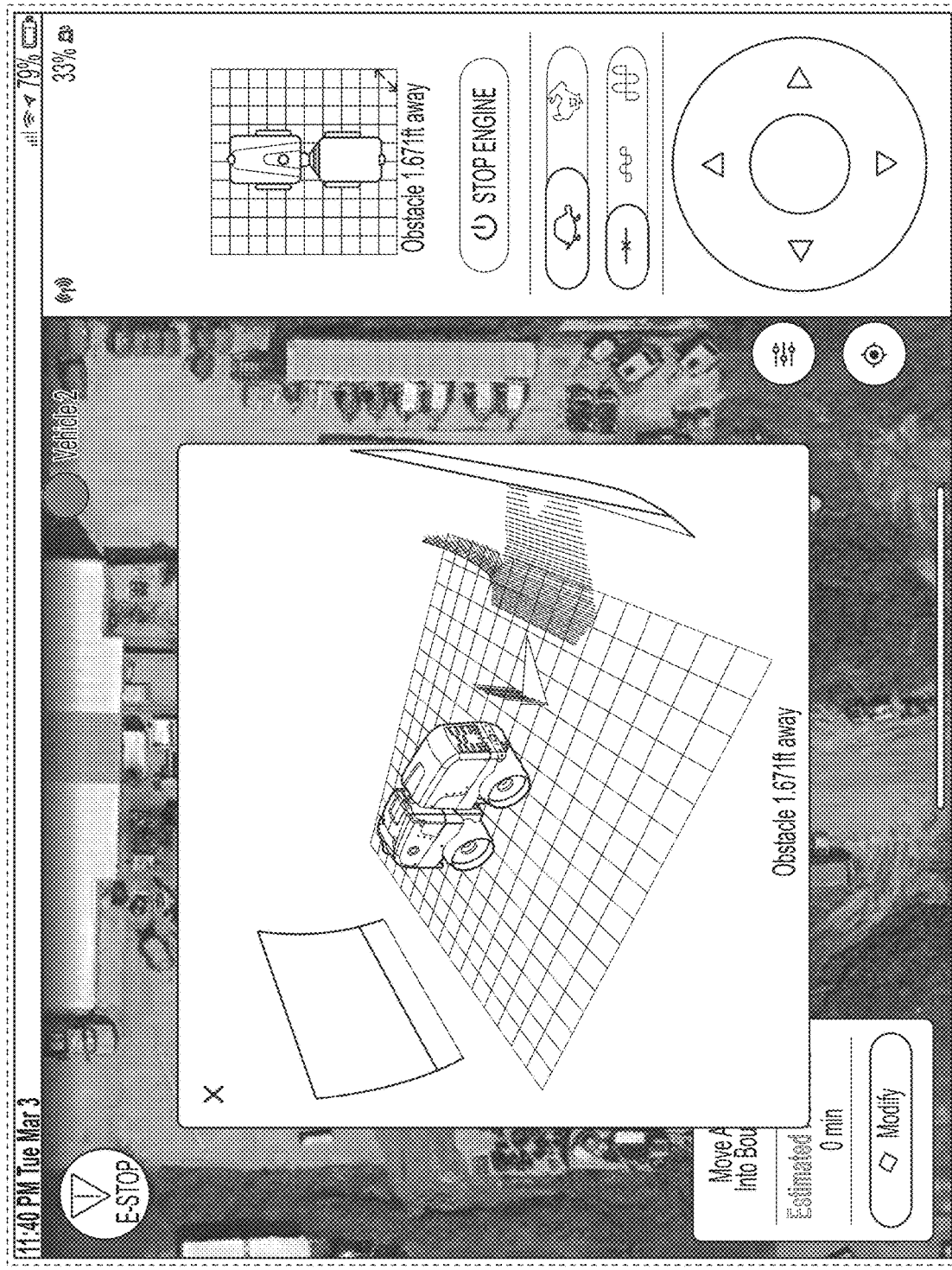
Figure 25:
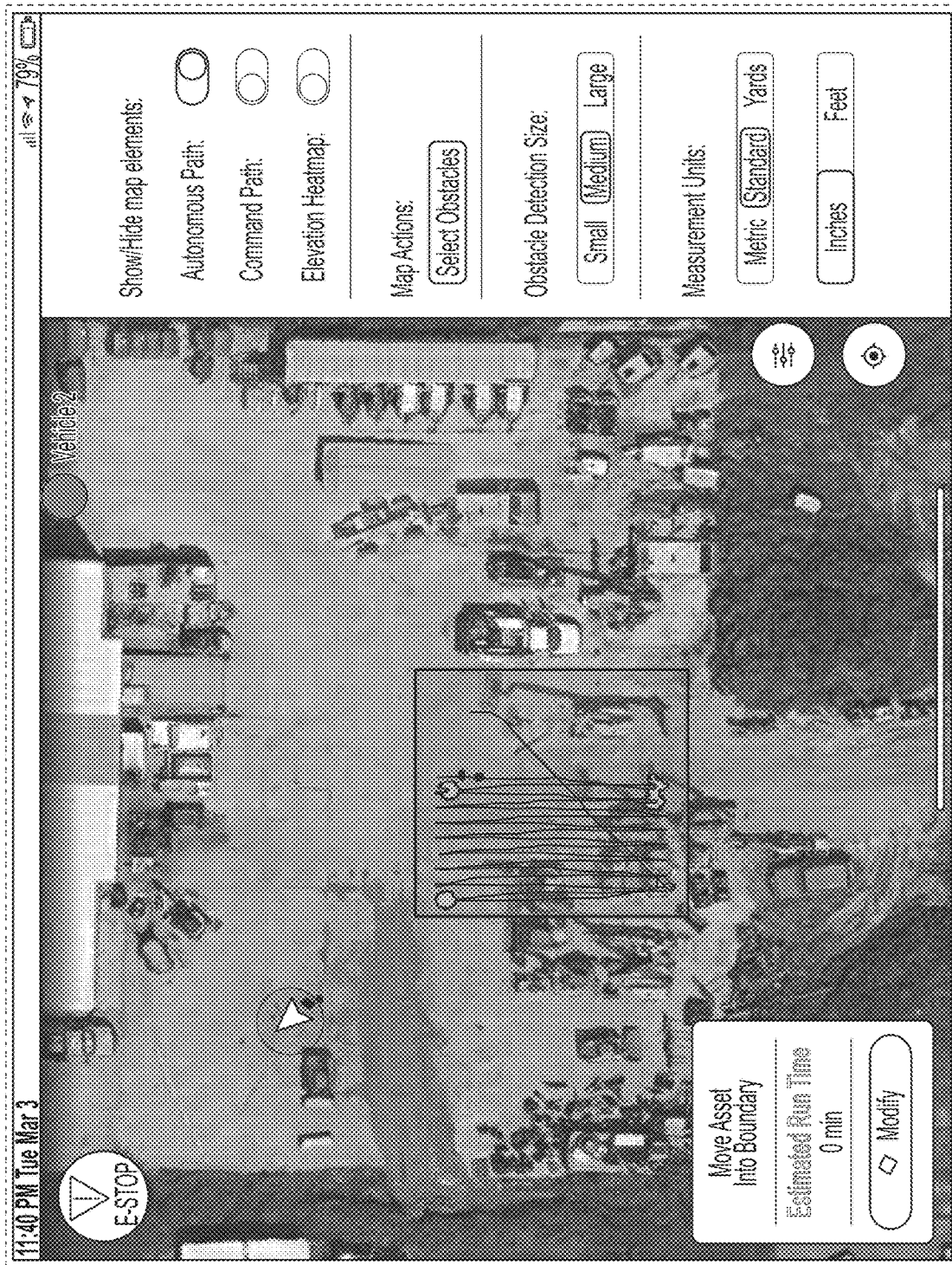
Figure 26:
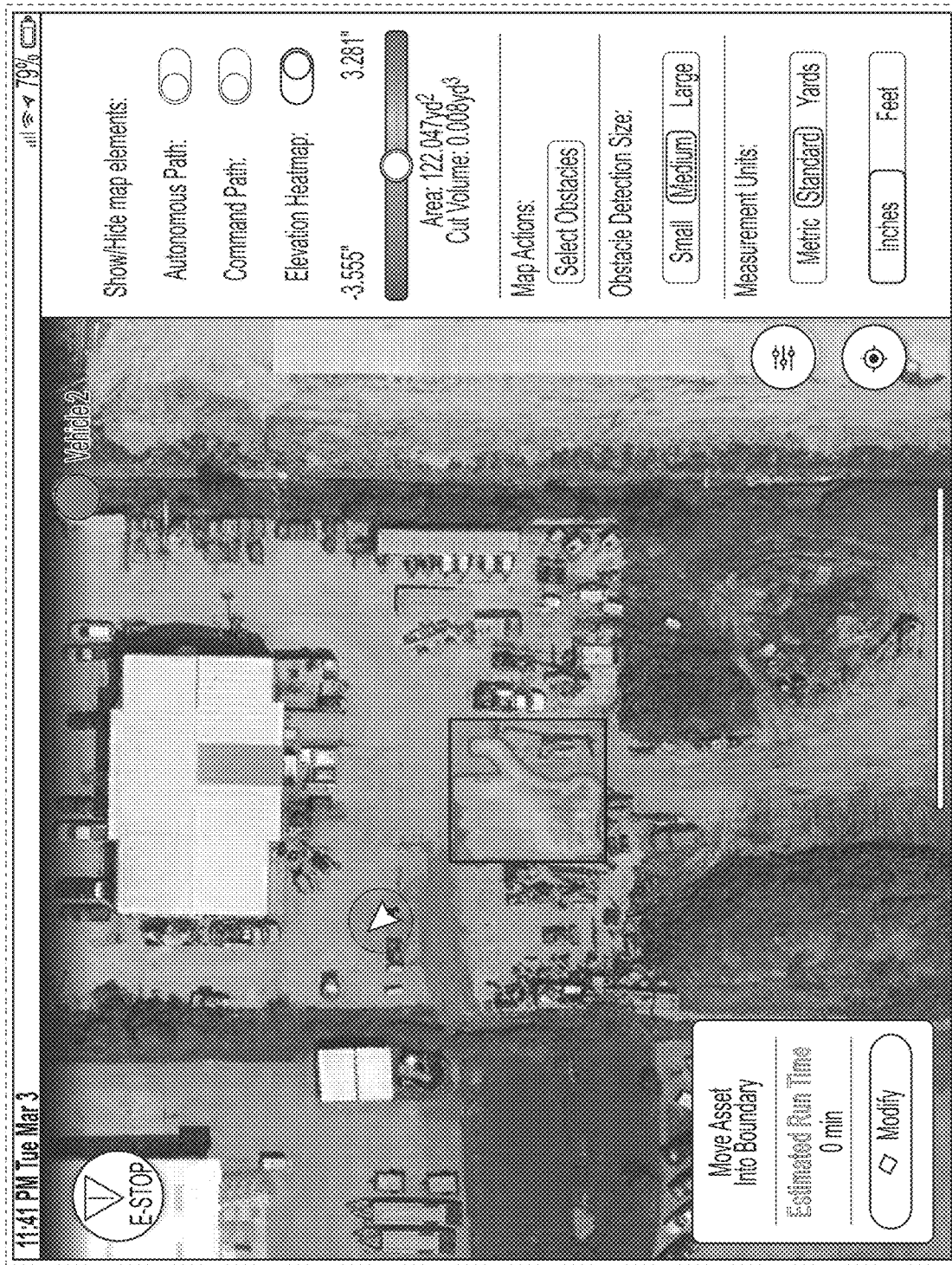

FIGS. 23-26 are exemplary screen shots of the MAP application showing various map views during the performance of a compaction task. FIGS. 23 and 25 show the boundary of the autonomous operating zone and the autonomous path travelled by the compactor during performance of the task (i.e., the actual driven path as opposed to the planned command path). FIG. 23 additionally shows an obstacle preview for an obstacle detected by the environmental sensors of the compactor when travelling along the command path (see the upper right corner of the display, which indicates that an obstacle is located a distance of 1.671 feet from the compactor). FIG. 24 shows a 3D view of the compactor and surrounding terrain, which can be generated by pressing the two-way expanding arrows in the lower right corner of the obstacle preview. The 3D interface allows the user to rotate, pan, and zoom around a 3D model of the vehicle showing its real world orientation, movement, and 360° sensor data indicating any detected obstacles that are within the viewable range. FIG. 26 shows an elevation heatmap for the autonomous operating zone during performance of the task. It should be noted that one or any combination of the autonomous path, the command path, and the elevation heatmap may be displayed, as selected through the settings menu shown in FIGS. 25 and 26.

Figure 27:
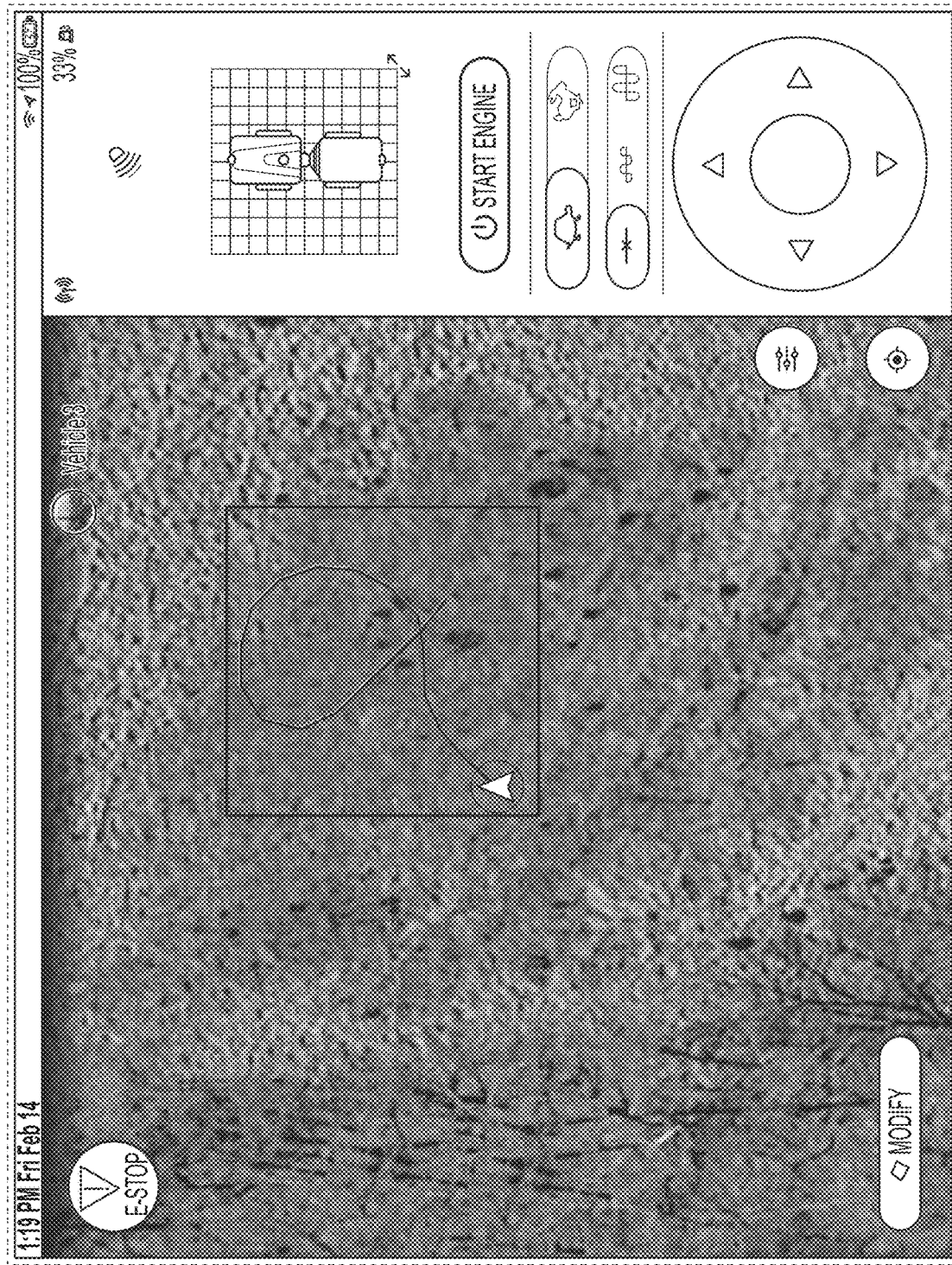
Figure 28:
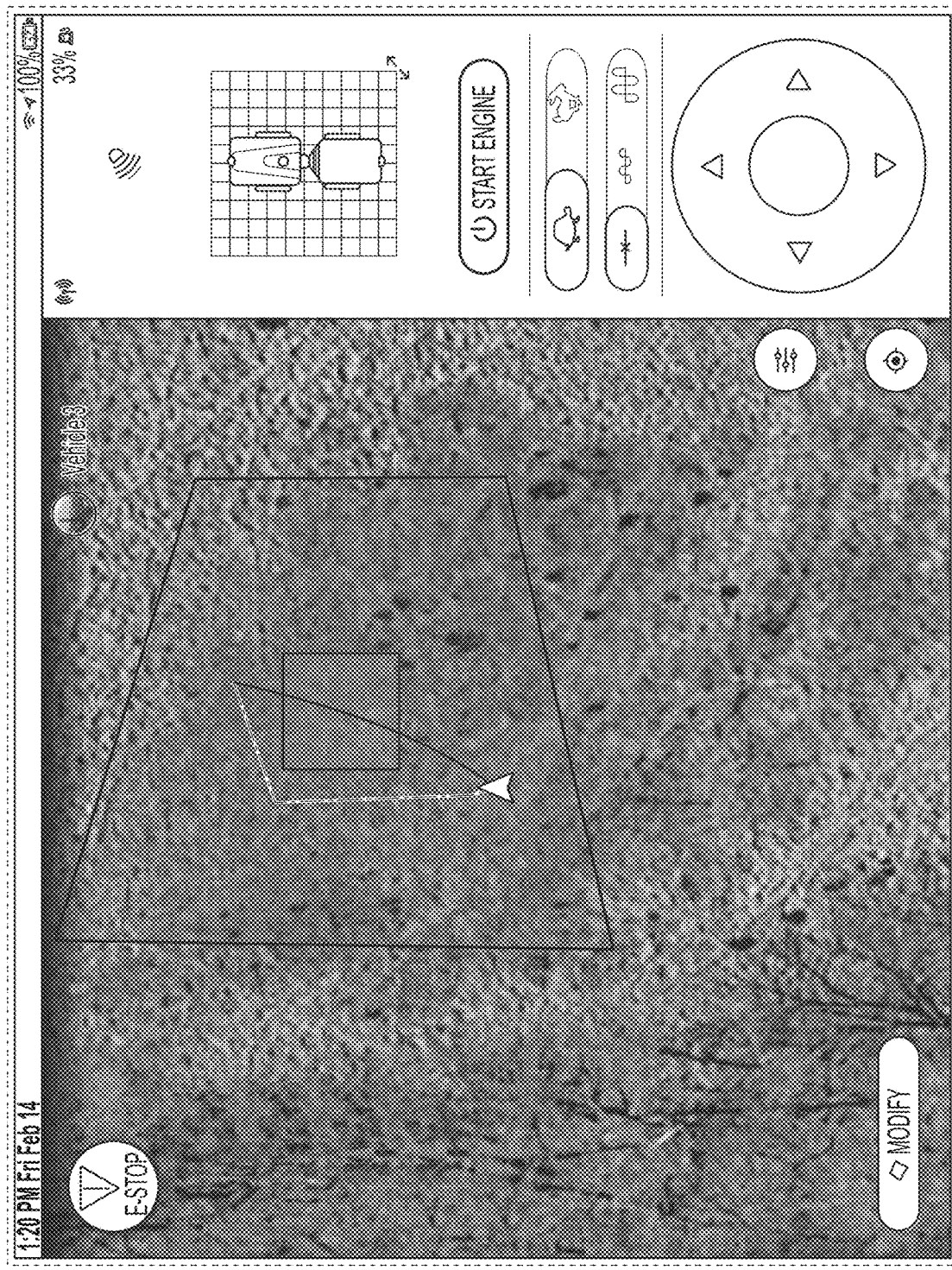

FIGS. 27-28 are exemplary screen shots of the MAP application showing various map views during the performance of a point-to-point travel task. FIG. 27 shows a command path for the compactor during performance of the task. FIG. 28 shows a command path for the compactor while avoiding an exclusion zone during performance of the task.

In the event that communications between robotics processing unit 110 and computing device 126 are lost during execution of a task, the vehicle can continue to perform the task. In some embodiments, if communications are not re-established within a configurable time period, the vehicle pauses task execution until communications are re-established. The autonomous operating zone and command path are stored in robotics processing unit 110, which will enable computing device 126 to receive the current map data when communications are re-established. Alternatively, if another computing device connects to robotics processing unit 110 (or to a master node from a vehicle cluster/swarm, as discussed below), that computing device will also receive the current map data.

It should be noted that the main menu of the MAP application includes directional buttons in the lower right corner of the screen that function as a joystick to the actual compactor. These directional buttons enable a user to drive the compactor forward and reverse and also adjust the driven body angle. Thus, the MAP application enables both autonomous and manual operation of the compactor.

Figure 11A:
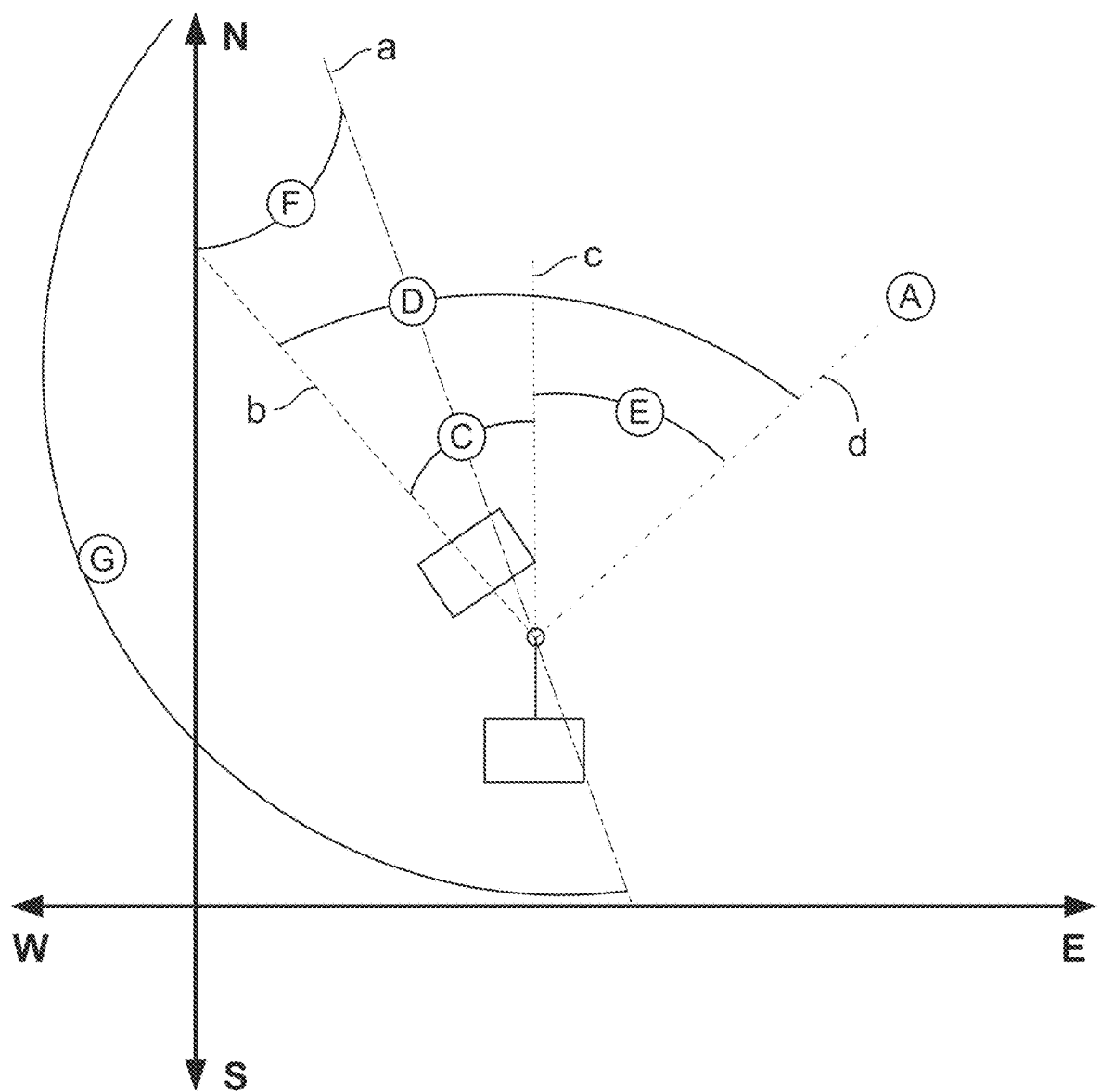
FIG. 11A is a diagram showing the angles referenced in the method of FIG. 11B.
Figure 11B:
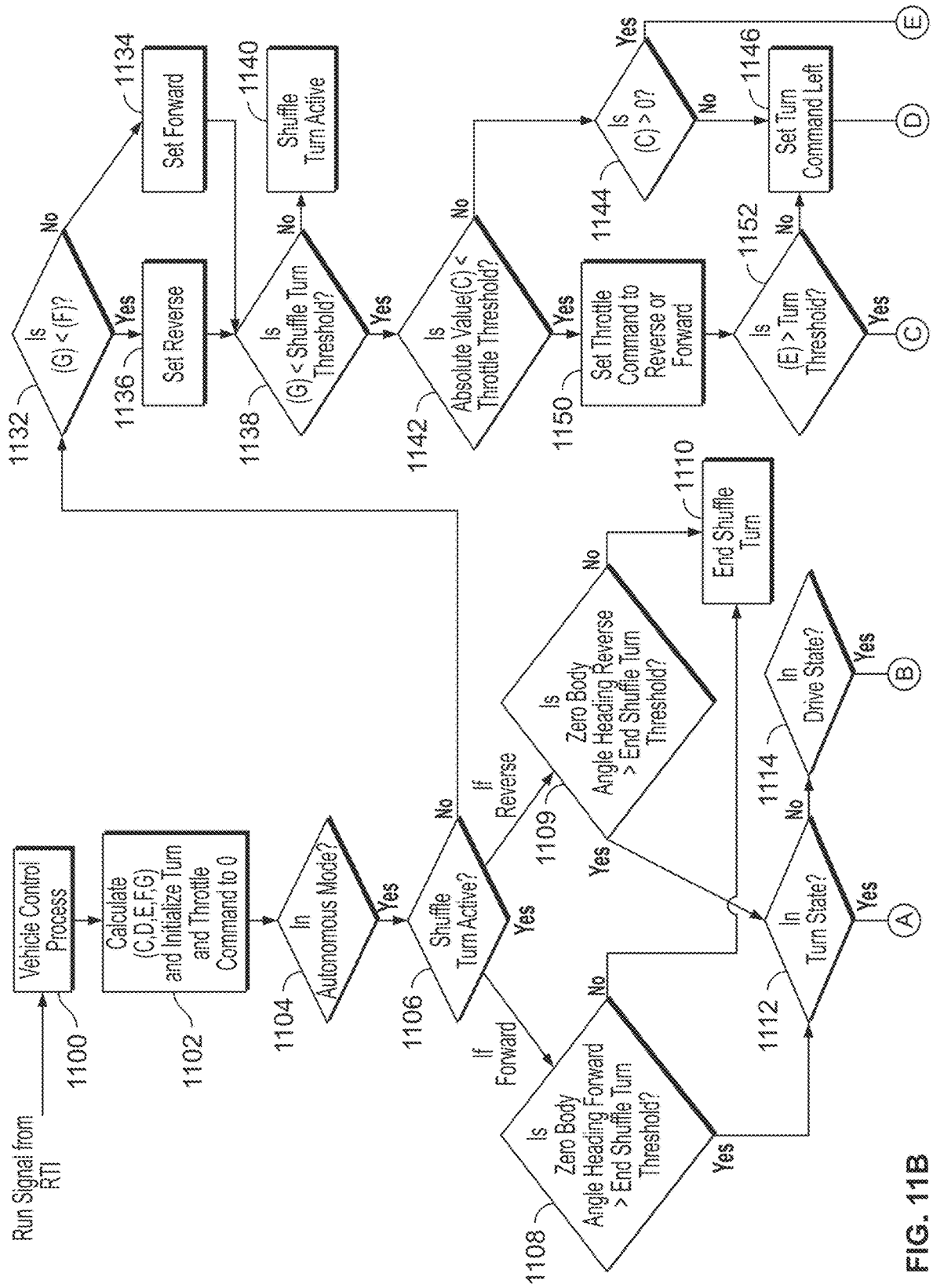
FIG. 11B is a flow chart of a method for controlling the compactor shown in FIGS. 2A and 2B using the system of FIG. 1.
Figure 11B:
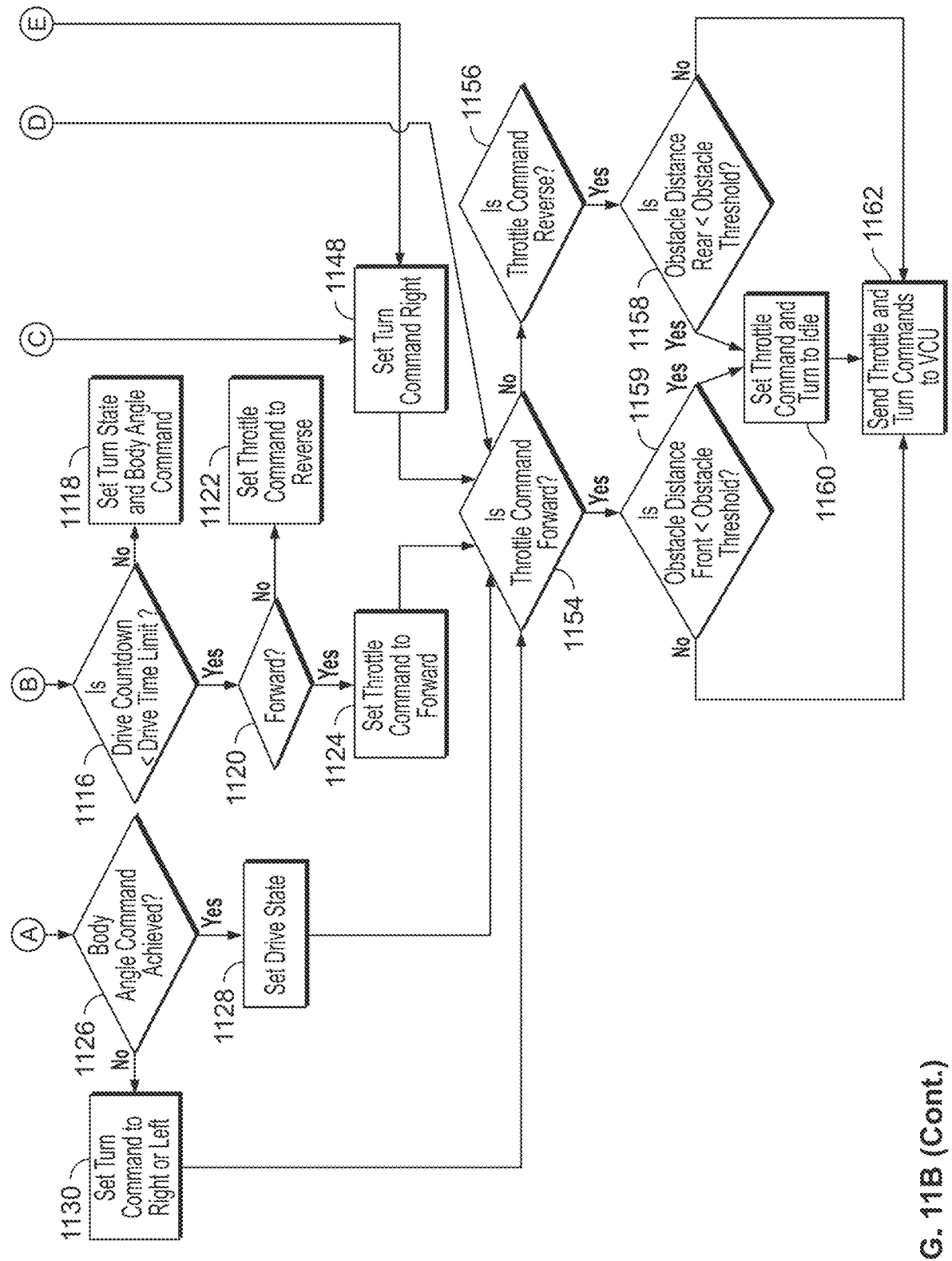

Referring now to FIGS. 11A and 11B, a method for controlling an articulated vehicle (e.g., compactor 200) so that it moves from waypoint to waypoint along a desired command path is shown. It should be understood that this method is performed by the vehicle controller process of robotics processing unit 110.

FIG. 11A illustrates the front and rear compartments of the vehicle as connected by an articulating joint, as well as the following lines: line a is the zero body angle heading (i.e., the heading that the vehicle would move if perfectly straight); line b is the front vector; line c is the rear vector; and line d is the line from the articulated joint to waypoint A. The angles shown in FIG. 11A, which are referenced in the flow chart of FIG. 11B described below, are as follows: angle C is the body angle between the front vector b and the rear vector c; angle D is the front line-of-sight angle between the front vector b and the waypoint line d; angle E is the rear line-of-sight angle between the rear vector c and the waypoint line d; angle F is the zero body angle heading forward; and angle G is the zero body angle heading reverse.

Referring now to FIG. 11B, the vehicle control process begins at step 1100. At step 1102, the angles shown in FIG. 11A (i.e., angles C, D, E, F and G) are calculated and the turn and throttle command is initialized to 0. At step 1104, it is determined whether the vehicle is operating in the autonomous mode. If so, in step 1106, it is determined whether the shuffle turn is active in step 1106.

If the shuffle turn is active in the forward direction, at step 1108, it is determined whether the zero body angle heading forward (i.e., angle F) is greater than an end shuffle turn threshold (typically 4 degrees in this embodiment). If not, the shuffle turn is ended in step 1110. If so, it is determined whether the vehicle is in a turn state in step 1112 and, if not, whether the vehicle is in a drive state in step 1114.

If the shuffle turn is active in the reverse direction, at step 1109, it is determined whether the zero body angle heading reverse (i.e., angle G) is greater than an end shuffle turn threshold (typically 4 degrees in this embodiment). If not, the shuffle turn is ended in step 1110. If so, it is determined whether the vehicle is in a turn state in step 1112 and, if not, whether the vehicle is in a drive state in step 1114.

If the vehicle is in a turn state in step 1112, it is determined whether the body angle command has been achieved in step 1126. If so, the vehicle is set to a drive state in step 1128. If not, the turn command is set to right or left, as applicable, in step 1130. In either case, the process proceeds to step 1154.

If the vehicle is in a drive state in step 1114, then it is determined in step 1116 whether the drive countdown is less than a drive time limit (typically 2 seconds in this embodiment). If not, then the turn state and body angle command is set in step 1118. If so, then it is determined whether the vehicle is moving forward in step 1120. If not, then the throttle command is set to reverse in step 1122. If so, then the throttle command is set to forward in step 1124 and the process proceed to step 1154.

Referring back to step 1106, if the shuffle turn is not active, then it is determined in step 1132 whether the zero body angle heading reverse (angle G) is less than the zero body angle heading forward (angle F). If not, then the vehicle is set to forward in step 1134. If so, then the vehicle is set to reverse in step 1136. In step 1138, it is determined whether the zero body angle heading reverse (angle G) is less than a shuffle turn threshold (typically 20 degrees in this embodiment). If not, the shuffle turn is active in set 1140. If so, then in step 1142, it is determined whether the absolute value of the body angle (angle C) is less than a throttle threshold (typically 15 degrees in this embodiment). If not, then it is determined in step 1144 whether the body angle (angle C) is greater than zero. If so, then the turn command is set to right in step 1148 and the process proceeds to step 1154. If not, then the turn command is set to left in step 1146 and the process proceeds to step 1154.

In step 1142, if it is determined that the absolute value of the body angle (angle C) is less than the throttle threshold, then the throttle command is set to reverse or forward, as applicable, in step 1150. In step 1152, it is determined whether the rear line-of-sight angle (angle E) is greater than a turn threshold (typically 1 degree in this embodiment). If so, then the turn command is set to right in step 1148 and the process proceeds to step 1154. If not, then the turn command is set to left in step 1146 and the process proceeds to step 1154.

In step 1154, it is determined whether the throttle command is forward. If so, then it is determined in step 1159 whether the obstacle distance front is greater than an obstacle threshold (typically 1 meter in this embodiment). If not, the throttle and turn commands are sent to the vehicle control unit at step 1162. If so, the throttle command and turn is set to idle in step 1160, and then the throttle and turn commands are sent to the vehicle control unit at step 1162.

If the throttle command is not forward in step 1154, then it is determined in step 1156 whether the throttle command is reverse. If so, then it is determined in step 1158 whether the obstacle distance rear is greater than an obstacle threshold (typically 1 meter in this embodiment). If not, the throttle and turn commands are sent to the vehicle control unit at step 1162. If so, the throttle command and turn is set to idle in step 1160, and then the throttle and turn commands are sent to the vehicle control unit at step 1162.

Referring now to FIG. 12, a method for detecting an obstacle in the vehicle's path is shown as reference numeral 1200. It should be understood that this method is performed by the obstacle detection process of robotics processing unit 110.

In step 1202, a point cloud is received from a sensor (e.g., 3D depth camera 122 mounted on front bumper 206 of compactor 200) or generated from a combination of sensors and defined via a sensor fusion algorithm. In step 1204, the points in the point cloud are filtered to only return points above or below one or more predefined thresholds. For example, the points may be filtered along one or any combination of the x-axis (i.e., the axis parallel to the ground and extending in a direction parallel to the path of travel), along the y-axis ((i.e., the axis parallel to the ground and extending in a direction perpendicular to the path of travel), or along the z-axis (i.e., the axis perpendicular to the ground). In the exemplary embodiment, the points are filtered along the z-axis and the x-axis.

In step 1206, the filtered points are sorted along the x-axis from the point closest to the vehicle to the point further from the vehicle. The first sorted point is selected in step 1208 and, in step 1210, the points located within a predefined radius (typically 2 centimeters in this embodiment) of the selected point are identified. In step 1212, it is determined whether the number of identified points is greater than a predefined threshold. If so, it is determined that an obstacle has been detected and a rectangle containing all of the filtered points is calculated in step 1216. Then, in step 1218, the world position of the rectangle (which is representative of the obstacle) is calculated and a new obstacle message is sent to the map process of robotics processing unit 110 for comparison to the grid. If there is no present obstacle at the determined grid points, then a new obstacle is added to the map and the command path is updated to avoid the obstacle. Thus, an exclusion zone is defined dynamically by the vehicle itself during operation of a task, e.g., when an obstacle is detected by the environmental sensors.

If the number of identified points is not greater than a predefined threshold in step 1212, then the next sorted point is selected in step 1214. Steps 1210 and 1212 are then repeated for each selected point until a point is located that has the required number of points located within the predefined radius, indicating that an obstacle has been detected. A rectangle containing all of the filtered points is then calculated in step 1216 and, in step 1218, the world position of the rectangle is calculated and a new obstacle message is sent to the map process of robotics processing unit 110, as described above. If no point has the required number of points located within the predefined radius, then it is determined that an obstacle is not detected.

Referring now to FIG. 13, a method for enabling and disabling an emergency stop of a vehicle is shown. As can be seen, the steps of this method are performed by the MAP application residing on a computing device (such as computing device 126 or computing device 128) ("Client"), an emergency cloud service ("Emergency Cloud Service"), and the vehicle controller process of robotics processing node 110 ("Vehicle Controller"). In some embodiments, the emergency cloud service comprises a third party system that provides emergency stop services to its subscribers. In this case, the emergency cloud service resides on the LTE network. In other embodiments, the emergency cloud service comprises a local service that resides on the local WiFi network at the work site. Of course, other network configurations may also be used, including a configuration in which a computing device directly communicates with the vehicle over an LTE, WiFi, or Bluetooth® connection.

Any user may trigger an emergency stop of one or more vehicles operating in autonomous mode by selecting the E-Stop button provided on the display of the user's computing device. The exemplary screen shots shown in FIGS. 20-28 illustrate the E-Stop button displayed on computing device 126. Of course, the E-Stop button may also be provided on smaller displays, such as the display of computing device 128. Once the E-Stop button has been selected by a user, the MAP application transmits an emergency stop message (Emergency Stop Enable) to the emergency cloud service. The emergency cloud service then broadcasts an emergency stop message (Emergency Stop Broadcast) to the vehicle controller process of robotics processing node 110.

Once the emergency stop message has been received by the vehicle controller process of robotics processing node 110, it causes the vehicle to enter a designated safe state, typically engine off and brake engaged. The vehicle controller process then sets the emergency stop status to stopped (Set Estop Status). The vehicle controller process then transmits the updated status (Emergency Stop Status) to the emergency cloud service, which transmits an updated map message (Map Client Update) or an updated vehicle status message (Vehicle Status Update) to the MAP application of each computing device. The MAP application checks whether the emergency stop has been enabled (Check Estop Enabled) and continues to send emergency stop broadcast messages (Emergency Stop Broadcast) until the status of the vehicle shows as being stopped.

Only users with designated authority to control the vehicle are capable of disabling the emergency stop via the MAP application. Disabling of the emergency stop requires a 2-step action in which (1) the user confirms via the MAP application that the obstacle is cleared, the vehicle is inspected, and the operational area is clear of personnel and (2) the MAP application sends an emergency stop disable request (Emergency Stop Disable) to the emergency cloud service. In the exemplary embodiment, the emergency cloud service resides on the LTE network and the user is authenticated with JSON web tokens and identified through one or more vehicles that are assigned to that user through an equipment rental platform, such as the platform described in U.S. Patent Application Publication No. US2020/0043262 titled "Method, System and Apparatus for Equipment Monitoring and Access Control" (which is incorporated herein by reference). Of course, other user authentication protocols may also be used.

Upon authentication of the user, the emergency cloud service transmits an emergency stop disable message (Emergency Stop Disable) to the vehicle controller process of robotics processing node 110 so that the vehicle can be restarted to resume operation. The vehicle controller process then sets the emergency stop status to operating (Set Estop Status) and transmits the updated status (Emergency Stop Status) to the emergency cloud service, which transmits an updated map message (Map Client Update) or an updated vehicle status message (Vehicle Status Update) to the MAP application of each computing device.

Figure 15A:
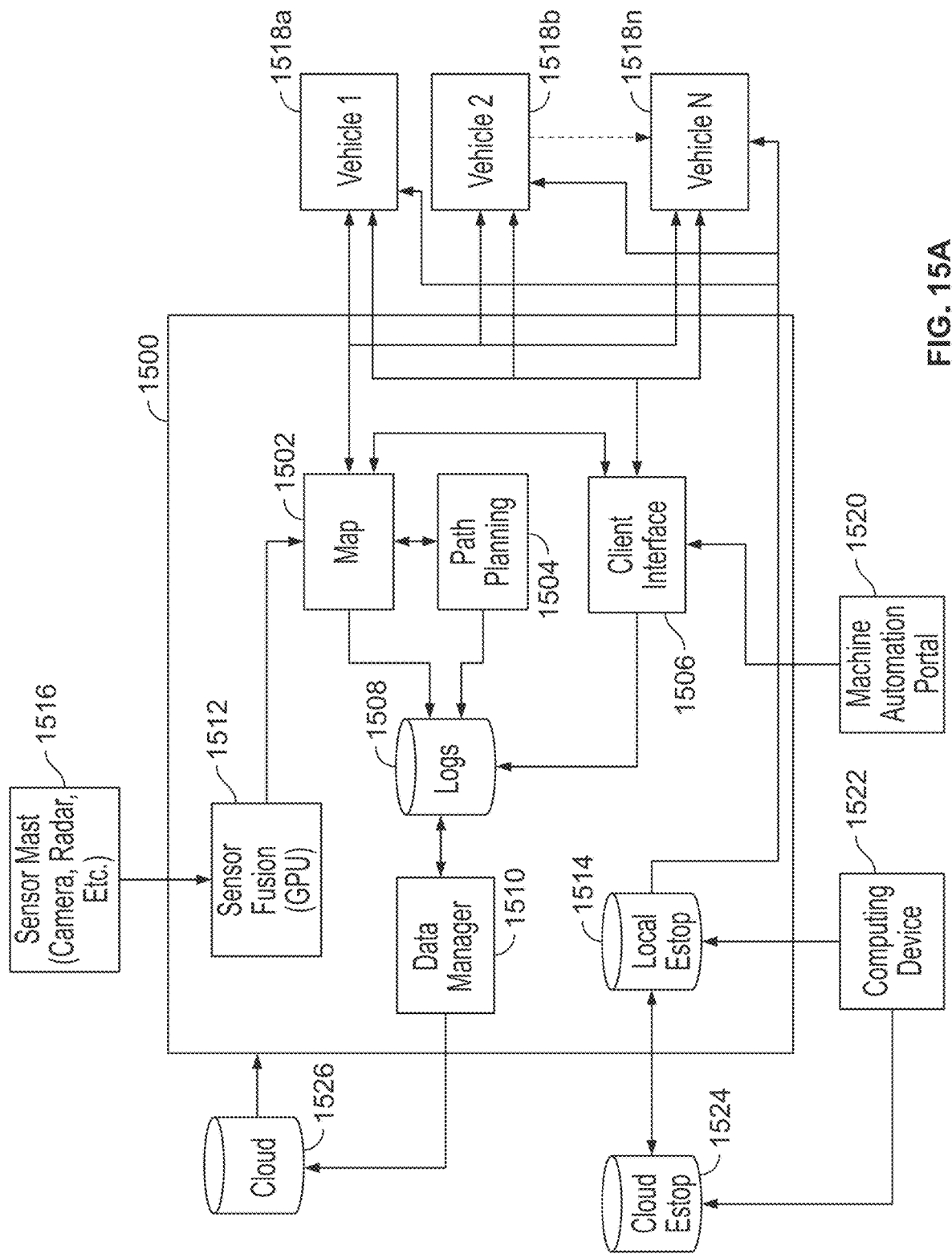
FIG. 15A is a block diagram of a system for enabling autonomous or semi-autonomous operation of multiple vehicles or other machines using a central work site control system.

Referring now to FIG. 15A, one embodiment of a work site control system for enabling autonomous or semi-autonomous operation of multiple vehicles or other machines is shown. The system includes a central robotics processing unit 1500 that enables centralized tracking and control of multiple vehicles 1518*a*, 1518*b* . . . 1518*n*. The number of vehicles that may be tracked and controlled by robotics processing unit 1500 is typically in the range of 2-25 vehicles, although the system is scalable to support over 100 vehicles. Each of vehicles 1518*a*-1518*n* includes most of the components shown in FIG. 1, with the exception that the map, path planning and client interface processes of robotics processing unit 110 (see FIG. 7) have been centralized for all of the vehicles within central robotics processing unit 1500—i.e., the map process 1502, path planning process 1504 and client interface 1506 store information for all of the vehicles in a common database 1508. It should be understood that the functionality of each of the map process 1502, path planning process 1504 and client interface 1506 is similar to that described above in connection with FIG. 7, with the exception that the functionality is now centrally located for each of the vehicles.

In this embodiment, robotics processing unit 1500 includes a data manager 1510 connected via the cloud 1526 that receives peripheral vehicle details provided by the web API of an equipment rental platform (e.g., the platform described in U.S. Patent Application Publication No. US2020/0043262 titled "Method, System and Apparatus for Equipment Monitoring and Access Control"). For example, data manager 1510 receives information on whether each of vehicles 1518*a*-1518*n* is available or has been assigned to a particular user and then stores that information in a database 1508. Cloud 1526 may also provide remote storage of logs pertaining to system data that can be used to restore system state and provide post action reporting to the user.

The system also includes a MAP application 1520 executed on a computing device that interfaces with the client interface process 1506 of robotics processing unit 1500. Only one computing device with a MAP application 1520 is shown in FIG. 15A, although multiple computing devices may be used at a single work site. The MAP application 1520 is configured to present on the display of the computing device any vehicle with a GPS sensor that is monitored and controlled by the rental platform when the vehicle is in a viewable radius. The MAP application enables a user to select a particular vehicle for control and operation, e.g., a vehicle from the list of available vehicles presented on the display of the computing device. In some embodiments, a vehicle is presented for selection only when the vehicle is not currently executing a task defined by a computing device. The computing device may issue commands to multiple vehicles, but typically any given vehicle is permitted to execute only a single task from a single computing device at a time. Vehicles that are not currently available for task assignment may be presented on the computing device, but selection of any such vehicle only permits the computing device to monitor (i.e., observe) the vehicle, rather than issue commands to the vehicle. The computing device may, however, be enabled to issue emergency stop commands to vehicles being monitored, as described below.

The system also includes a sensor mast system 1516 configured to track all moving vehicles at the work site. The sensor mast system is comprised of a LiDAR camera and radar sensor suite that is capable of tracking larger obstacles up to 300 meters. Robotics processing unit 1500 implements a sensor fusion process 1512 that fuses the sensor data received from sensor mast system 1516 and provides the data to the map process 1502. Thus, the system provides any MAP application-controlled autonomous vehicle with knowledge about the position of other vehicles on the site so that it can pause operations if another vehicle approaches within a predetermined radius.

The system further provides an emergency stop service 1514 that enables a user to implement an emergency stop for one or all of vehicles 1518*a*-1518*n*. As shown in FIG. 15A, a computing device 1522 may transmit the emergency stop message directly to emergency stop service 1514 over the local WiFi network at the work site. Computing device 1522 may also transmit the emergency stop message over the LTE network to a third party emergency cloud service 1524, which broadcasts the emergency stop message to local emergency stop service 1514. Computing device 1522 may comprise a computing device that implements MAP application 1520, or may be part of a third party system. Of course, multiple computing devices will typically be able to transmit emergency stop messages to emergency stop services 1514. It should be understood that the functionality of emergency stop service 1514 is similar to that described above in connection with FIG. 13.

In some embodiments, the system may operate in a swarm mode in which multiple vehicles can work together to complete a variety of tasks. For each vehicle, the user may select a task and the system will plan the path for each of the multiple vehicles. The vehicles may be of the same type, or the vehicles may be of different types to enable completion of, for example, compaction, grading, and pad preparation tasks. In some embodiments, the elevation heatmap for a particular vehicle may trigger the generation of a new task for another vehicle. For example, if a compactor's elevation heatmap shows areas of low elevation, a new task may be triggered for a skid loader to deliver more aggregate to that area for further compaction. The types of vehicles that may be operated in swarm mode will be apparent to those skilled in the art.

Referring to FIG. 15B, another embodiment of a system for enabling autonomous or semi-autonomous operation of multiple vehicles or other machines is shown. In this embodiment, one vehicle operates as a master vehicle with a robotics processing unit 1530 that enables centralized tracking and control of multiple slave vehicles 1540*a* . . . 1540*n*. The number of vehicles that may be tracked and controlled by the master vehicle is typically in the range of 2-25 vehicles, although the system is scalable to support over 100 vehicles. Each of vehicles 1540*a*-1540*n* includes most of the components shown in FIG. 1, with the exception that the map, path planning and client interface processes of robotics processing unit 110 (see FIG. 7) have been centralized for all of the vehicles within the master vehicle—i.e., the map process 1536, path planning process 1534 and client interface 1532 of robotics processing unit 1530. It should be understood that the functionality of each of the map process 1536, path planning process 1534 and client interface 1532 is similar to that described above in connection with FIG. 7, with the exception that the functionality is now centrally located for each of the vehicles within the master vehicle and the data relating to these processes is stored on the cloud 1542 to provide remote storage of logs pertaining to system data that can be used to restore system state and provide post action reporting to the user.

The system also includes a MAP application 1538 executed on a computing device that interfaces with the client interface process 1532 of robotics processing unit 1530. Only one computing device with a MAP application 1538 is shown in FIG. 15B, although multiple computing devices may be used at a single work site. The MAP application 1538 is configured to present on the display of the computing device one or more vehicles and enable a user to select a particular vehicle for control and operation. In some embodiments, a vehicle is presented for selection only when the vehicle is not currently executing a task defined by a computing device. The computing device may issue commands to multiple vehicles, but typically any given vehicle is permitted to execute only a single task from a single computing device at a time. Vehicles that are not currently available for task assignment may be presented on the computing device, but selection of any such vehicle only permits the computing device to monitor (i.e., observe) the vehicle, rather than issue commands to the vehicle. The computing device may, however, be enabled to issue emergency stop commands to vehicles being monitored. Those skilled in the art will appreciate that certain features described in connection with the system of FIG. 15A may also be implemented on the system of FIG. 15B.

Figure 16:
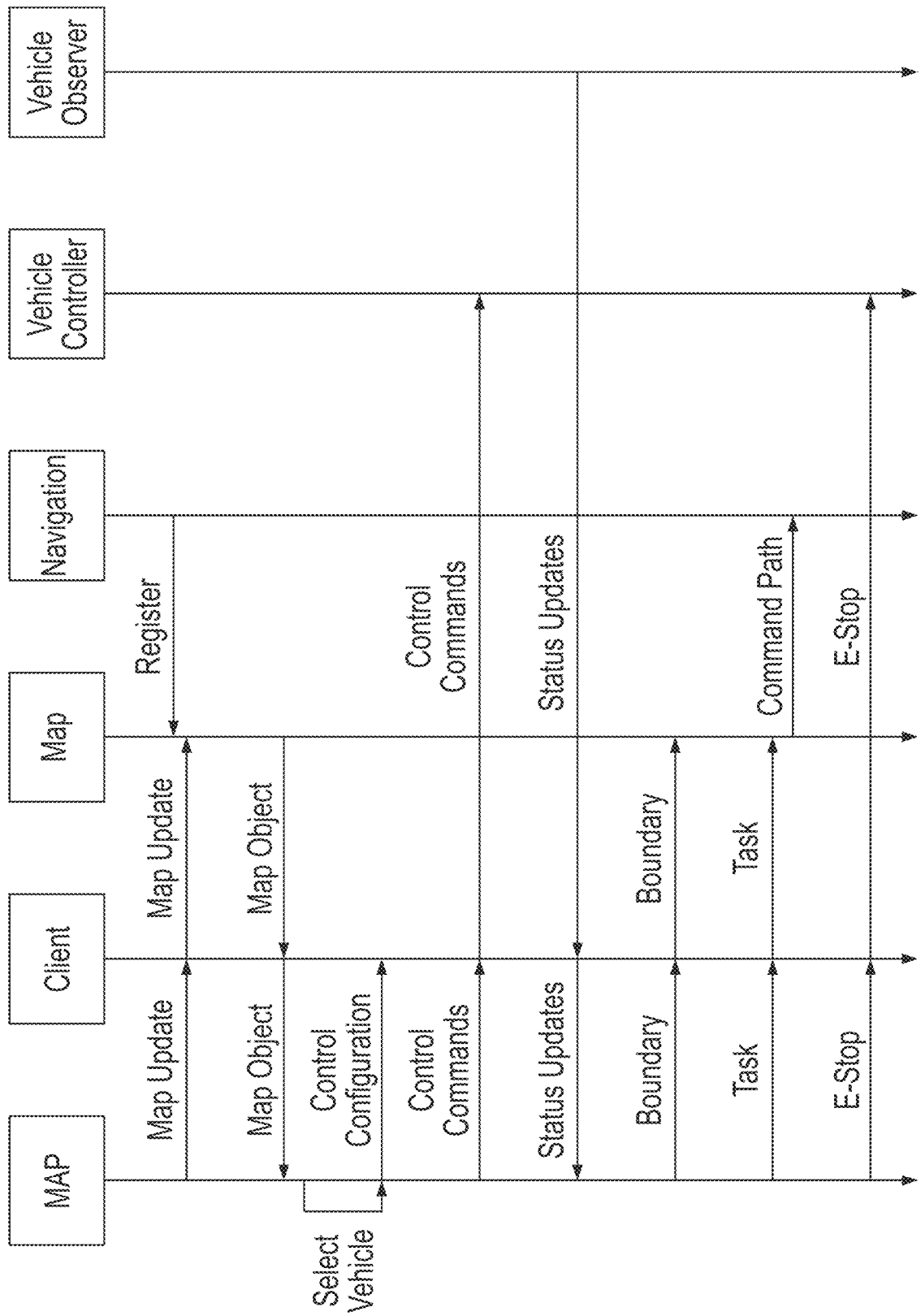
FIG. 16 is a message flow diagram of a method that enables autonomous or semi-autonomous operation of multiple vehicles using either of the systems of FIGS. 15A and 15B.

Referring now to FIG. 16, a method for enabling autonomous or semi-autonomous operation of multiple vehicles using either the system of FIG. 15A or the system of FIG. 15B is shown. As can be seen, the steps of this method are performed by different components of each system, including the MAP application 1520 of a computing device as shown in FIG. 15A or the MAP application 1538 of a computing device as shown in FIG. 15B ("MAP"), the client interface process 1506 of central robotics processing node 1500 shown in FIG. 15A or the client interface process 1532 of robotics processing node 1530 shown in FIG. 15B ("Client"), the map process 1502 of central robotics processing node 1500 shown in FIG. 15A or the map process 1536 of robotics processing node 1530 shown in FIG. 15B ("Map"), the navigation process of the robotics processing unit for the vehicles 1518a-1518b shown in FIG. 15A or the vehicles 1540a-1540n shown in FIG. 15B ("Navigation"), the vehicle controller process of the robotics processing unit for the vehicles 1518a-1518b shown in FIG. 15A or the vehicles 1540a-1540n shown in FIG. 15B ("Vehicle Controller"), and the vehicle observer process of the robotics processing unit for the vehicles 1518a-1518b shown in FIG. 15A or the vehicles 1540a-1540n shown in FIG. 15B ("Vehicle Observer").

First, the navigation process of each vehicle sends registration information (Register) to the central map process. When a MAP application of a computing device sends a map update (Map Update) to the central client interface, the central client interface transmits the map update (Map Update) to the central map process. The central map process returns a map object (Map Object) to the central client interface, which transmits the map update to the MAP application of the computing device (and the MAP application of each other computing device connected to the system).

The user then uses the MAP application to select a vehicle (Select Vehicle). Upon selection of the vehicle, the MAP application transmits a unique vehicle identifier for the selected vehicle and a unique user identifier (Control Configuration) to the central client interface process. The MAP application also transmits control commands such as the joystick inputs, engine state, vibration state, autonomous mode state or any other controllable functionality on a vehicle (Control Commands) to the central client interface process, which transmits those control commands (Control Commands) to the vehicle controller process of the selected vehicle. The vehicle observer process of the selected vehicle transmits status updates (Status Updates) to the central client interface process, which transmits those status updates (Status Updates) to the MAP application.

When a boundary is established, or later modified, for each operational area and exclusion zone, the MAP application transmits the boundary configuration (Boundary) to the central client interface process, which transmits the boundary configuration (Boundary) to the central map process for generation of a map with the defined boundaries. Also, when a user submits a coverage task, the MAP application transmits the task type and/or task details (Task) to the central client interface process, which transmits the task type and/or task details (Task) to the central map process. It can be appreciated that the task types and task details will be dependent on the nature and capabilities of the vehicle. The central map process then creates the autonomous task and transmits a command path generated by the central path planning process ("Command Path) to the navigation process of the selected vehicle.

If a user enters an emergency stop command during operation of the selected vehicle, the MAP application transmits an emergency stop message (E-Stop) to the central client interface process, which transmits the emergency stop message (E-Stop) to the vehicle controller process of the selected vehicle. The emergency stop message may also be transmitted to other vehicles operating at the work site, as described above. Other details relating to the messages shown in FIG. 16 will be apparent to those skilled in the art based on the disclosure provided herein.

General Information

In this disclosure, the use of any and all examples or exemplary language (e.g., "for example" or "as an example") is intended merely to better describe the invention and does not pose a limitation on the scope of the invention. No language in the disclosure should be construed as indicating any non-claimed element essential to the practice of the invention.

Also, the use of the terms "comprises," "comprising," or any other variation thereof, are intended to cover a non-exclusive inclusion, such that a system, device, or method that comprises a list of elements does not include only those elements, but may include other elements not expressly listed or inherent to such system, device, or method.

Further, the use of relative relational terms, such as first and second, are used solely to distinguish one unit or action from another unit or action without necessarily requiring or implying any actual such relationship or order between such units or actions.

Finally, while the present invention has been described and illustrated hereinabove with reference to various exemplary embodiments, it should be understood that various modifications could be made to these embodiments without departing from the scope of the invention. For example, while the exemplary embodiments are described above in relation to autonomous operation of a compactor, the invention may also be used to enable autonomous operation of other types of machines. Therefore, the present invention is not to be limited to the specific structural configurations or methodologies of the exemplary embodiments, except insofar as such limitations are included in the following claims.

What is claimed and desired to be secured by Letters Patent is as follows:

1. A system for autonomous or semi-autonomous operation of an articulated construction vehicle having a front compartment and a rear compartment, comprising:
   a machine automation portal (MAP) application configured to be executed on a computing device, wherein the MAP application is configured to enable the computing device to provide a graphical user interface that enables a user to (a) define a boundary of an operating zone representing an area within a work site in which the articulated construction vehicle is to perform a coverage task and (b) define the coverage task to be performed by the articulated construction vehicle within the work site; and a robotics processing unit configured to (a) receive the boundary of the operating zone and the coverage task from the computing device, (b) generate a planned command path that the articulated construction vehicle will travel to perform the coverage task within the operating zone, and (c) control operation of the articulated construction vehicle by (i) determining a steering angle between the front compartment and the rear compartment, wherein the steering angle is determined utilizing GPS data received from each of a first GPS receiver associated with the front compartment and a second GPS receiver associated with the rear compartment and (ii) utilizing the steering angle to control operation of the articulated construction vehicle so that the articulated construction vehicle travels the planned command path to perform the coverage task within the operating zone.

2. The system of claim 1, wherein the articulated construction vehicle comprises a trench roller compactor.

3. The system of claim 1, wherein the robotics processing unit is configured to determine the steering angle based on the GPS data and a location of each of the first and second GPS receivers.

4. The system of claim 3, wherein the front and rear compartments are pivotally connected at a pivot joint, and wherein the robotics processing unit is configured to determine an absolute value of the steering angle based on (a) a distance from the pivot joint to the first GPS receiver, (b) a distance from the pivot joint to the second GPS receiver, and (c) a linear distance between the first GPS receiver and the second GPS receiver.

5. The system of claim 4, wherein the robotics processing unit is configured to determine the linear distance between the first GPS receiver and the second GPS receiver based on (a) a distance of the first GPS receiver from a reference point in a north direction, (b) a distance of the first GPS receiver from a reference point in an east direction, (c) a distance of the second GPS receiver from the reference point in the north direction, and (d) a distance of the second GPS receiver from the reference point in the east direction.

6. The system of claim 4, wherein the robotics processing unit is configured to determine a direction of the steering angle based on one or more of (a) the distance from the pivot joint to the first GPS receiver, (b) the distance from the pivot joint to the second GPS receiver, (c) the linear distance between the first GPS receiver and the second GPS receiver, (d) a rate of change in the linear distance between the first GPS receiver and the second GPS receiver, (e) a rate of change in the steering angle, (f) an error in the steering angle, (g) a rate of change of an absolute orientation of the articulated vehicle, and (h) a velocity of a forward axis of the articulated vehicle.

7. The system of claim 1, wherein a second steering angle is determined utilizing a rotary position sensor.

8. The system of claim 7, wherein the front compartment includes a front hinge and the rear compartment includes a rear hinge, wherein the front hinge is pivotally connected to the rear hinge via a hinge pin, and wherein the rotary position sensor is configured to provide a position feedback signal of the rotating hinge pin to the robotics processing unit.

9. The system of claim 7, wherein the first and second GPS receivers are used to calibrate the rotary position sensor.

10. The system of claim 7, wherein the robotics processing unit is further configured to (a) determine if the steering angle determined utilizing the first and second GPS receivers and the second steering angle determined utilizing the rotary position sensor differ by more than a predetermined margin and (b) when the determination is affirmative, provide an alert to check one or both of the first and second GPS receivers and the rotary position sensor.

11. The system of claim 1, wherein the robotics processing unit is located on the articulated construction vehicle.

12. The system of claim 1, wherein the robotics processing unit is located remote from the articulated construction vehicle.

13. The system of claim 12, wherein the robotics processing unit is located on a central work site control system that controls a plurality of construction vehicles.

14. The system of claim 12, wherein the robotics processing unit is located on a master vehicle that controls a plurality of slave construction vehicles.

15. The system of claim 1, wherein the robotics processing unit is configured to receive the boundary of the operating zone and the coverage task from the computing device prior to generation of the planned command path.

16. A system for autonomous or semi-autonomous operation of an articulated construction vehicle having a front compartment and a rear compartment that are pivotally connected at a pivot joint, the system comprising:
a first GPS receiver located in the front compartment;
a second GPS receiver located in the rear compartment; and
a machine automation portal (MAP) application configured to be executed on a computing device, wherein the MAP application is configured to enable the computing device to provide a graphical user interface that enables a user to (a) define a boundary of an operating zone representing an area within a work site in which the articulated construction vehicle is to perform a coverage task and (b) define the coverage task to be performed by the articulated construction vehicle within the work site;
a robotics processing unit configured to (a) receive the boundary of the operating zone and the coverage task from the computing device, (b) generate a planned command path that the articulated construction vehicle will travel to perform the coverage task within the operating zone, and (c) control operation of the articulated construction vehicle by (i) receiving GPS data from each of the first GPS receiver and the second GPS receiver, (ii) determining a steering angle between the front compartment and the rear compartment based on the GPS data and a location of each of the first and second GPS receivers in relation to the pivot joint, and (iii) utilizing the steering angle to control operation of the articulated construction vehicle so that the articulated construction vehicle travels the planned command path to perform the coverage task within the operating zone.

17. The system of claim 16, wherein the articulated construction vehicle comprises a trench roller compactor.

18. The system of claim 16, wherein the robotics processing unit is configured to determine an absolute value of the steering angle based on (a) a distance from the pivot joint to the first GPS receiver, (b) a distance from the pivot joint to the second GPS receiver, and (c) a linear distance between the first GPS receiver and the second GPS receiver.

19. The system of claim 18, wherein the robotics processing unit is configured to determine the linear distance between the first GPS receiver and the second GPS receiver based on (a) a distance of the first GPS receiver from a reference point in a north direction, (b) a distance of the first GPS receiver from a reference point in an east direction, (c) a distance of the second GPS receiver from the reference point in the north direction, and (d) a distance of the second GPS receiver from the reference point in the east direction.

20. The system of claim 16, wherein the robotics processing unit is configured to determine a direction of the steering angle based on one or more of (a) the distance from the pivot joint to the first GPS receiver, (b) the distance from the pivot joint to the second GPS receiver, (c) the linear distance between the first GPS receiver and the second GPS receiver, (d) a rate of change in the linear distance between the first GPS receiver and the second GPS receiver, (e) a rate of change in the steering angle, (f) an error in the steering angle, (g) a rate of change of an absolute orientation of the articulated vehicle, and (h) a velocity of a forward axis of the articulated vehicle.

21. The system of claim 16, wherein a second steering angle is determined utilizing a rotary position sensor.

22. The system of claim 16, wherein the robotics processing unit is deployed within the articulated construction vehicle.

23. The system of claim 16, wherein the robotics processing unit is located remote from the articulated construction vehicle.

24. The system of claim 23, wherein the robotics processing unit is located on a central work site control system that controls a plurality of construction vehicles.

25. The system of claim 23, wherein the robotics processing unit is located on a master vehicle that controls a plurality of slave construction vehicles.

26. The system of claim 16, wherein the robotics processing unit is configured to receive the boundary of the operating zone and the coverage task from the computing device prior to generation of the planned command path.

27. An articulated construction vehicle system, comprising:
   an articulated construction vehicle having a front compartment pivotally connected to a rear compartment, wherein a first GPS receiver is located in the front compartment and a second GPS receiver is located in the rear compartment;
   a machine automation portal (MAP) application configured to be executed on a computing device, wherein the MAP application is configured to enable the computing device to provide a graphical user interface that enables a user to (a) define a boundary of an operating zone representing an area within a work site in which the articulated construction vehicle is to perform a coverage task and (b) define the coverage task to be performed by the articulated construction vehicle within the work site; and
   a robotics processing unit configured to (a) receive the boundary of the operating zone and the coverage task from the computing device, (b) generate a planned command path that the articulated construction vehicle will travel to perform the coverage task within the operating zone, and (c) control operation of the articulated construction vehicle by (i) receiving GPS data from each of the first GPS receiver and the second GPS receiver, (ii) determining a steering angle between the front compartment and the rear compartment based on the GPS data and a location of each of the first and second GPS receivers, and (iii) utilizing the steering angle to control operation of the articulated construction vehicle so that the articulated construction vehicle travels the planned command path to perform the coverage task within the operating zone.

28. The system of claim 27, wherein the front compartment includes a front hinge and the rear compartment includes a rear hinge, wherein the front hinge is pivotally connected to the rear hinge via a hinge pin, and wherein the articulated construction vehicle further comprises a rotary position sensor configured to provide a position feedback signal of the rotating hinge pin to the robotics processing unit.

29. The system of claim 28, wherein the first and second GPS receivers are used to calibrate the rotary position sensor.

30. The system of claim 28, wherein the robotics processing unit is further configured to (a) determine if the steering angle determined utilizing the first and second GPS receivers and the second steering angle determined utilizing the rotary position sensor differ by more than a predetermined margin and (b) when the determination is affirmative, provide an alert to check one or both of the first and second GPS receivers and the rotary position sensor.

31. The system of claim 27, wherein the robotics processing unit is configured to receive the boundary of the operating zone and the coverage task from the computing device prior to generation of the planned command path.

* * * * *